US008516114B2

(12) United States Patent
Banavar et al.

(10) Patent No.: US 8,516,114 B2
(45) Date of Patent: Aug. 20, 2013

(54) METHOD AND APPARATUS FOR CONTENT PRE-FETCHING AND PREPARATION

(75) Inventors: Guruduth Somasekhara Banavar, Yorktown Heights, NY (US); Maria Rene Ebling, White Plains, NY (US); Guerney Douglass Holloway Hunt, Yorktown Heights, NY (US); Hui Lei, Scarsdale, NY (US); Daby Mousse Sow, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1526 days.

(21) Appl. No.: 10/112,206

(22) Filed: Mar. 29, 2002

(65) Prior Publication Data

US 2003/0187984 A1 Oct. 2, 2003

(51) Int. Cl.
*G06F 15/173* (2006.01)

(52) U.S. Cl.
USPC .......................................... 709/225; 709/246

(58) Field of Classification Search
USPC .............. 709/224, 225, 223, 226, 229, 231, 709/232, 246, 245
See application file for complete search history.

(56) References Cited

U.S. PATENT DOCUMENTS

| | | | | | |
|---|---|---|---|---|---|
| 5,493,692 | A | * | 2/1996 | Theimer et al. | 455/26.1 |
| 5,790,935 | A | * | 8/1998 | Payton | 725/91 |
| 5,878,223 | A | * | 3/1999 | Becker et al. | 709/223 |
| 6,243,755 | B1 | * | 6/2001 | Takagi et al. | 709/229 |
| 6,430,118 | B1 | * | 8/2002 | Anderson | 369/30.1 |
| 6,460,073 | B1 | * | 10/2002 | Asakura | 709/206 |
| 6,666,763 | B2 | * | 12/2003 | Kawamura et al. | 463/6 |
| 6,742,033 | B1 | * | 5/2004 | Smith et al. | 709/224 |
| 6,871,186 | B1 | * | 3/2005 | Tuzhilin et al. | 705/26.7 |
| 6,871,218 | B2 | * | 3/2005 | Desai et al. | 709/213 |
| 6,968,380 | B1 | * | 11/2005 | Singhal et al. | 709/226 |
| 6,985,933 | B1 | * | 1/2006 | Singhal et al. | 709/219 |
| 7,006,820 | B1 | * | 2/2006 | Parker et al. | 455/419 |
| 7,072,932 | B1 | * | 7/2006 | Stahl | 709/203 |
| 7,133,972 | B2 | * | 11/2006 | Jeddeloh | 711/137 |
| 2002/0165967 | A1 | * | 11/2002 | Morgan | 709/227 |
| 2003/0195940 | A1 | * | 10/2003 | Basu et al. | 709/213 |
| 2005/0060365 | A1 | * | 3/2005 | Robinson et al. | 709/203 |
| 2006/0053219 | A1 | * | 3/2006 | Kutsumi et al. | 709/224 |

OTHER PUBLICATIONS

1. D. Duchamp, "Prefetching Hyperlinks," Proceedings of Usits' 99: The 2nd Usenix Symposium on Internet Technologies & Systems, Boulder, Colorado, USA, Oct. 11-14, 1999.
U.S. Appl. No. 09/479,821, Jan. 7, 2000, M.R. Ebling et al., "Method and Apparatus for Providing an Awareness-Service Architecture".
U.S. Appl. No. 60/306,314, Jul. 18, 2001, "Method and Apparatus for Providing Extensive Scalable Transcoding of Multimedia Content".

* cited by examiner

*Primary Examiner* — Dhairya A Patel
(74) *Attorney, Agent, or Firm* — Anne V. Dougherty; Ryan, Mason & Lewis, LLP

(57) ABSTRACT

A method of pre-fetching and preparing content in an information processing system is provided. The method includes the steps of generating at least one content pre-fetching policy and at least one content preparation policy, wherein each of the policies are at least in part a function of context information associated with a user. The content is pre-fetched based on information contained within the at least one content pre-fetching policy. Once the content has been pre-fetched, it is prepared based on information contained within the at least one content preparation policy. The context information associated with the user includes at least one of the user's usage patterns, current location, future plans and preferences.

8 Claims, 20 Drawing Sheets

| Time Stamp | Context Type | Context Attributes | Duration | Context Event | Supplier | Source(s) | Subject(s) |
|---|---|---|---|---|---|---|---|
| 900 | 905 | 910 | 915 | 920 | 925 | 930 | 935 |
| | | | | | | | |
| | | | | | | | |
| | | | | | | | |
| | | | | | | | |
| | | | | | | | |
| | | | | | | | |
| | | | | | | | |
| | | | | | | | |

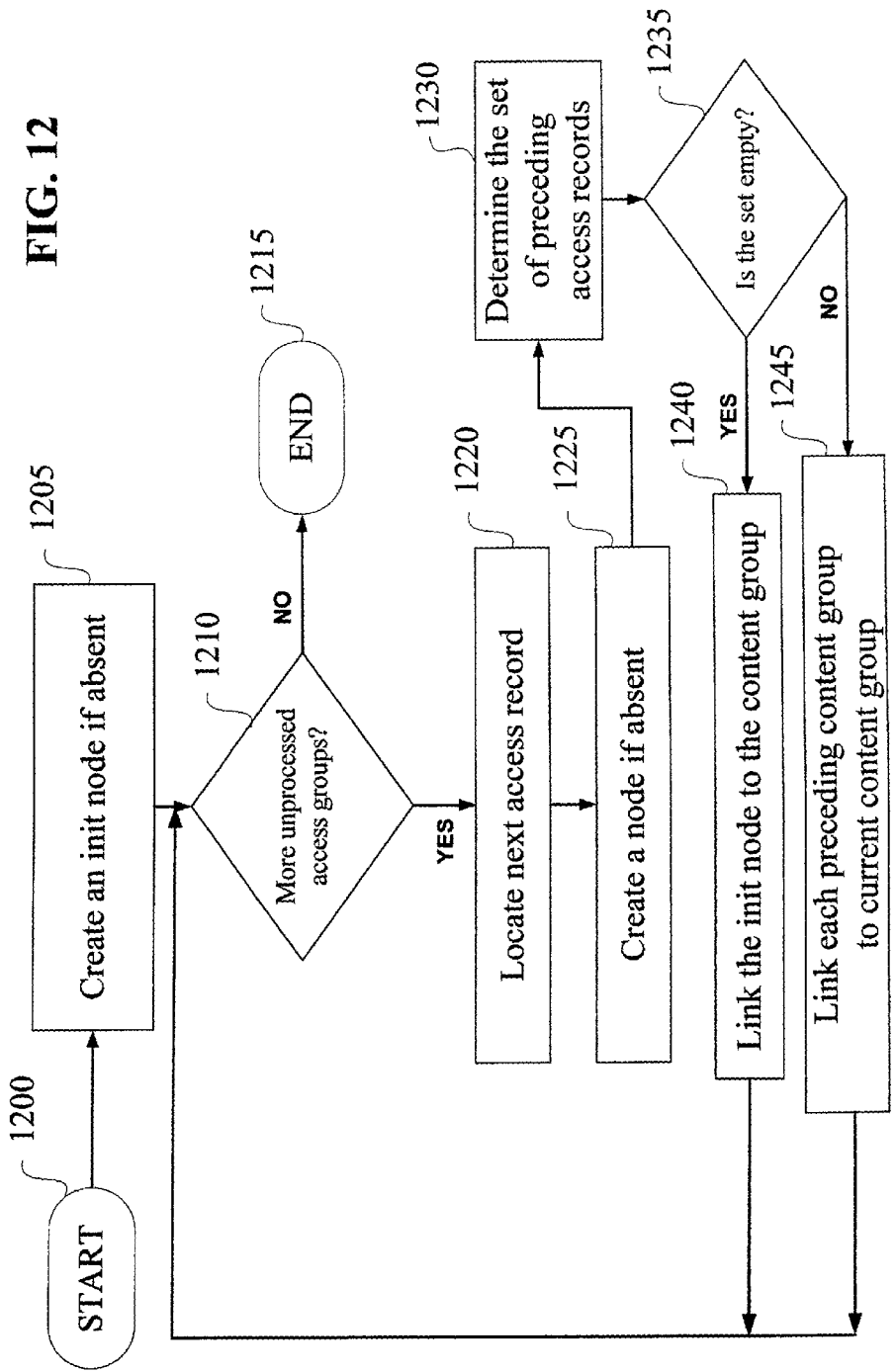

|  | Subject | Event | Characteristics | Statistics |
|---|---|---|---|---|
|  |  |  |  |  |
|  |  |  |  |  |
|  |  |  |  |  |
|  |  |  |  |  |
|  |  |  |  |  |
|  |  |  |  |  |

| Requesting User | Object Identifier | Time Range | Device Types | Other Applicable Contexts |
|---|---|---|---|---|
| | | | | |
| | | | | |
| | | | | |
| | | | | |

| Content Unit ID | Replica Descriptor | Expiration Time |
|---|---|---|
| | | |
| | | |
| | | |
| | | |

FIG. 19

METHOD AND APPARATUS FOR CONTENT PRE-FETCHING AND PREPARATION

FIELD OF THE INVENTION

The present invention relates generally to an information processing system and, more particularly, to techniques for pre-fetching and preparing content.

BACKGROUND OF THE INVENTION

Pervasive computing promises an environment in which people will be able to access any content, anywhere, at any time, and on any device. While pervasive computing offers several advantages, one of its shortcomings is that there may be increased access latency due to the extremely dynamic and variable nature of such an environment. In addition to the traditional problem of access latency due to network and server load, there are three additional factors that contribute to latency.

The first factor is device heterogeneity. That is, client devices have different form factors, modalities, and presentation formats. Due to this heterogeneity, it is necessary to have format transformation (or transcoding) capabilities in content delivery networks, especially for dynamically generated data. Such transcoding operations introduce latency that will be perceived by the user.

The second factor is network infrastructure. There are large variations in the physical characteristics of wireless channels which affect the performance perceived by the end user. This is due not only to the number of different such technologies available today but also to inherent properties of wireless channels such as multi-path fading problems, distance between client and base stations, and interference problems resulting from shared spectrum. A user's experience of accessing services can change dramatically and is a function of the user's location, the available link technologies and the number of active connections operating in the same frequency band.

The third factor is user context. Services that are available to the user may change as a function of time and as a function of the user's context. For example, services accessed in a professional environment may be different from the services accessed in a home environment. In such a situation, discovering the appropriate services at each location and binding them (i.e., interconnecting the services to each other and to other application components) introduces additional latency.

Traditional caching schemes used on proxy servers or edge servers are not sufficient to reduce access latency in pervasive environments due, primarily, to two main reasons. First, content and applications are increasingly personalized to suit the tasks and tastes of individual users. Thus, content cached for one user is often unsuitable for other users. Second, increased user mobility potentially reduces access locality, thus reducing the effectiveness of caching.

Traditional caching schemes used on client devices are also not sufficient in pervasive environments. First, mobile and task-specialized devices may be resource constrained and thus may not be able to support a sufficiently large caching storage area. Second, many pervasive applications are context specific. For example, the content delivered to the device might be specific to the geographic location of the device. Thus, content cached for one location may not be suitable in other locations.

U.S. Pat. No. 5,493,692, entitled "Selective Delivery of Electronic Messages in a Multiple Computer System Based on Context and Environment of a User," to Theimer et al. (hereinafter referred to as the '692 patent), which is hereby incorporated by reference herein, discloses a method for selectively delivering electronic messages to an identified user or users in a system of mobile and fixed devices, based on the context of the system and the environment of the identified user. However, the '692 patent does not include context information that includes historical information and future plans. Additionally, although the '692 patent uses current context information to deliver electronic messages, the '692 patent does not use context information to pre-distribute and pre-process all kinds of content, as well as to manage replication among multiple copies of content.

Pre-fetching based on hyperlinks (and more generally, application structure) has been studied and applied extensively. For example, a paper entitled "Pre-fetching Hyperlinks" by Dan Duchamp teaches a method for pre-fetching web pages into a client cache. This work makes predictions based on document content only, and does not make use of any other forms of context information. It also does not address the issues of preparation or replication management.

U.S. Pat. No. 6,243,755, entitled "Information Processing System Using Information Caching Based on User Activity," to Takagi et al. (hereinafter referred to as the '755 patent), which is hereby incorporated by reference herein, discloses a system and method to predict the information that will be required in the future by individual users using computing devices and the time at which this information will be required, based upon knowledge of the users' activity schedule. The prediction is used to transfer the necessary information to the computing device at the necessary time via a network. However, the '755 patent does not teach either management of the replicated copies of content created due to pre-fetching, or preparation of content such as via binding and transcoding ahead of time.

It is therefore apparent that a need exists for improved techniques which avoid the problems associated with the conventional approaches.

SUMMARY OF THE INVENTION

The present invention is directed to techniques for processing content in a network wherein the content is prefetched and prepared for easy and efficient access by a user. The content is prefetched and prepared in accordance with context information of the user.

In one aspect of the invention, a method of processing content in a network is provided, wherein the method includes the steps of predicting a device used by a user to access content residing in the network, wherein the prediction of the device is at least in part a function of context information associated with the user; and processing the content for access by the user via the predicted device. The processing step includes the step of transcoding the content into a predetermined format such that the format is compatible with the predicted device.

In another aspect of the invention, a method of processing content in a network includes the steps of (1) predicting at least one content item to be requested by a user, wherein the prediction of the content item is at least in part a function of context information associated with the user, and (2) pre-processing the content item for access by the user. Additionally, the method includes the steps of pre-fetching the content item and transferring the content item to at least one replica store wherein the content item is held pending a request by the user.

In another aspect of the invention, a method of maintaining data in an information network, includes the steps of (1)

storing replicas of content data in two or more replica stores wherein timing of the synchronization process is a function of a user's historical context information.

In yet another aspect of the present invention, a method of pre-fetching and preparing content in an information processing system is provided. The method includes the steps of generating at least one content pre-fetching policy and at least one content preparation policy, wherein each of the policies are at least in part a function of context information associated with a user. The content is pre-fetched based on information contained within the at least one content pre-fetching policy. Once the content has been pre-fetched, it is prepared based on information contained within the at least one content preparation policy. The context information associated with the user includes at least one of the user's usage patterns, current location, future plans and preferences.

The present invention increases responsiveness of access to pervasive applications by (1) predicting the future information access needs (including the device of access) of users by using context information, such as (but not limited to) the users' usage patterns, current location, and future plans, as well as their preferences, and (2) by using this prediction to pre-distribute the right content in the right form at the right time to the right locations, and to manage it appropriately.

BRIEF DESCRIPTION OF THE DRAWINGS

For a better understanding of the invention, reference is made to the following description of exemplary embodiments thereof, and to the accompanying drawings, wherein:

FIG. 9 illustrates the various types of information that may be stored in the context history table;

FIG. 12 is a flow chart illustrating the process by which an access pattern is generated for a specific combination of context attribute values, in accordance with a preferred embodiment of the present invention;

FIG. 14 is a sample data sheet illustrating the information stored in the persistent context table;

FIG. 18 is a sample data sheet illustrating the format of the policies information stored in the policies table; and FIG. 19 is a sample data sheet illustrating the format of the information stored in the SyncDB table.

DETAILED DESCRIPTION OF PREFERRED EMBODIMENTS

Figure 1:
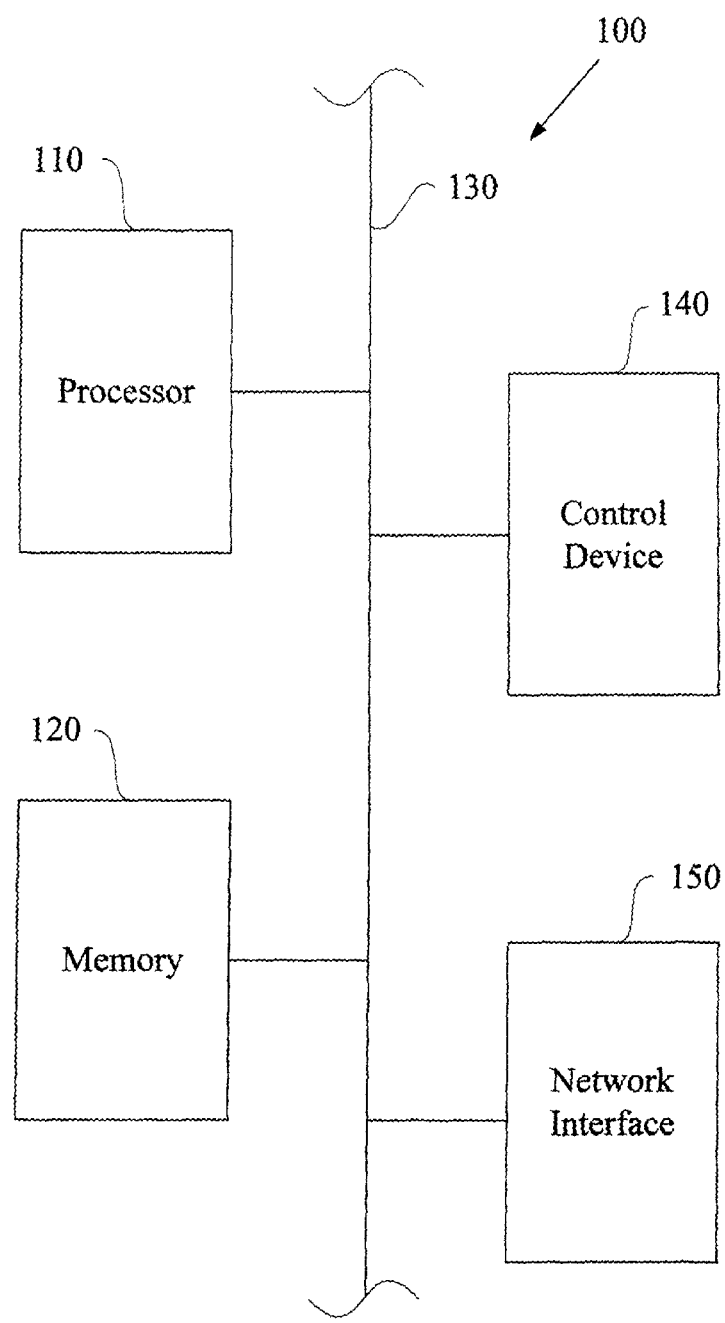
FIG. 1 is a block diagram illustrating a processing device for use in accordance with an embodiment of the present invention.

It is to be appreciated that the term "data" as used herein is not limited to any particular format. For instance, "data" may include text, images, video, audio, etc. Also, the term "processor" as used herein is intended to include any processing device, such as, for example, one that includes a CPU (central processing unit). The term "memory" as used herein is intended to include a machine readable medium associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, such as a keyboard for inputting data to the processing unit, and/or one or more output devices, such as a CRT display and/or printer, for providing results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

It is also to be appreciated that the following terms, as used herein, are intended to have the following definitions. The term "content" refers to static and dynamic data, applications, multimedia, code, or anything that can be delivered electronically. The act of "binding" refers to interconnecting application components such as service components (e.g., Web services or Enterprise JavaBeans) and presentation components (e.g., servlets or Java Server Pages) together to form an entire workable application. A "client device" is a computational device, which is used by an end user, such as but not limited to a cellular phone, a personal digital assistant (PDA), a personal computer (PC), a Kiosk, a television or a vehicle. A "content group" is a unit of pre-fetching or fetching from the server. The content group may contain multiple content items or items that have not been accessed. A "content item" is a particular piece of content accessed by a user.

"Content preparation" includes, for example, transcoding and binding. A "content server" is a computational device for storing, managing, and distributing content, such as but not limited to a file server, an application server, a database server, or a web server. The content server includes the software residing thereon. The term "context" refers to the physical and virtual environment in which a computation task occurs. "Context attributes" include aspects of a context. An "edge server" is defined as a computational device and its software which are placed near the client devices in the network. The purpose of an edge server is to increase performance and availability. More specifically, an edge server is an intermediary node intended to increase performance, scalability, and availability by caching, load sharing, and prefetching. An edge server typically has a large amount of storage within which to cache content.

"Future context" refers to anticipated context based upon user input rather than derived from past historical context. "Historical context" refers to a record of past context, both physical and virtual. "Persistent context" refers to a pattern observed in the historical context. The term "pre-fetching" refers to the act of fetching (pulling) as well as of pushing content ahead of demand. A "replica store" is a functional unit that maintains synchronized copies of content, and serves that content to clients. "Replicas" are read/write copies of content. "Replication management" refers to the acts of creation, synchronization, and garbage collection. "Transcoding" is the act of transforming data from one format to another. Often, the transformation transforms the data into a format which is usable by a particular device. "Transient context" refers to current or recent context. A "user agent" is software through which a user interacts with the system. This software commonly resides on the client device. The user agent may change as the user moves location or changes devices.

"Pre-fetching" includes techniques that move content close to a user's device before the content is accessed. "Preparation" includes techniques that process the content (e.g., transcoding or binding) before the content is accessed. Both pre-fetching and preparation of content can be broken down into three steps: (1) prediction based on the general notion of user context, including all forms of past and present behavior, and future plans, as well as environment, to predict the future behavior of a user, (2) the action itself (i.e., pre-fetching and/or preparation), and (3) replication management (i.e., management of the life cycle of multiple copies of content, including creation, consistency management, and deletion). "Context-based prediction" includes techniques which are described above in step (1). "Replication management" includes techniques which are described above in step (3).

The techniques for content preparation (e.g., transcoding and binding) differ significantly from those for pre-fetching. For example, in order to pre-transcode content, the device type used to access particular content must be predicted. Second, in order to pre-bind the components of applications, the relationships among application components must be tracked. Due to these differences, conventional pre-fetching cannot be easily applied or extended to support content preparation.

FIG. 1 shows an example of a processing device 100 that may be used to implement, for example, one or more computer software programs for executing the functions of the present invention. The processing device 100 includes a processor 110 and a memory 120 which communicate over at least a portion of a set 130 of one or more system buses. Also utilizing a portion of the set 130 of system buses are a control device 140 and a network interface device 150. The processing device 100 may represent, for example, portions or combinations of one or more of edge servers 200, content hosts 205, a mobile phone 210, a smart phone 215, a personal computer 220, a tablet 225, a television appliance 230 (each of which are described below with reference to FIG. 2) or any other type of processing device for use in implementing at least a portion of the functions in accordance with the present invention. The elements of the processing device 100 may correspond to conventional elements of such devices.

For example, the processor 110 may represent a microprocessor, central processing unit (CPU), digital signal processor (DSP), or application-specific integrated circuit (ASIC), as well as portions or combinations of these and other processing devices. The memory 120 is typically an electronic memory, but may comprise or include other types of storage devices, such as disk-based optical or magnetic memory. The control device 140 may be associated with the processor 110. The control device 140 may be further configured to transmit control signals.

The techniques of the present invention described herein may be implemented in whole or in part using software stored and executed using the respective memory and processor elements of the processing device 100. For example, the techniques may be implemented at least in part using one or more software programs stored in memory 120 and executed by processor 110. The particular manner in which such software programs may be stored and executed in device elements such as memory 120 and processor 110 is well understood in the art and therefore not described in detail herein.

It should be noted that the processing device 100 may include other elements not shown, or other types and arrangements of elements capable of providing the function of the present invention described herein.

Computing Environment

Figure 2:
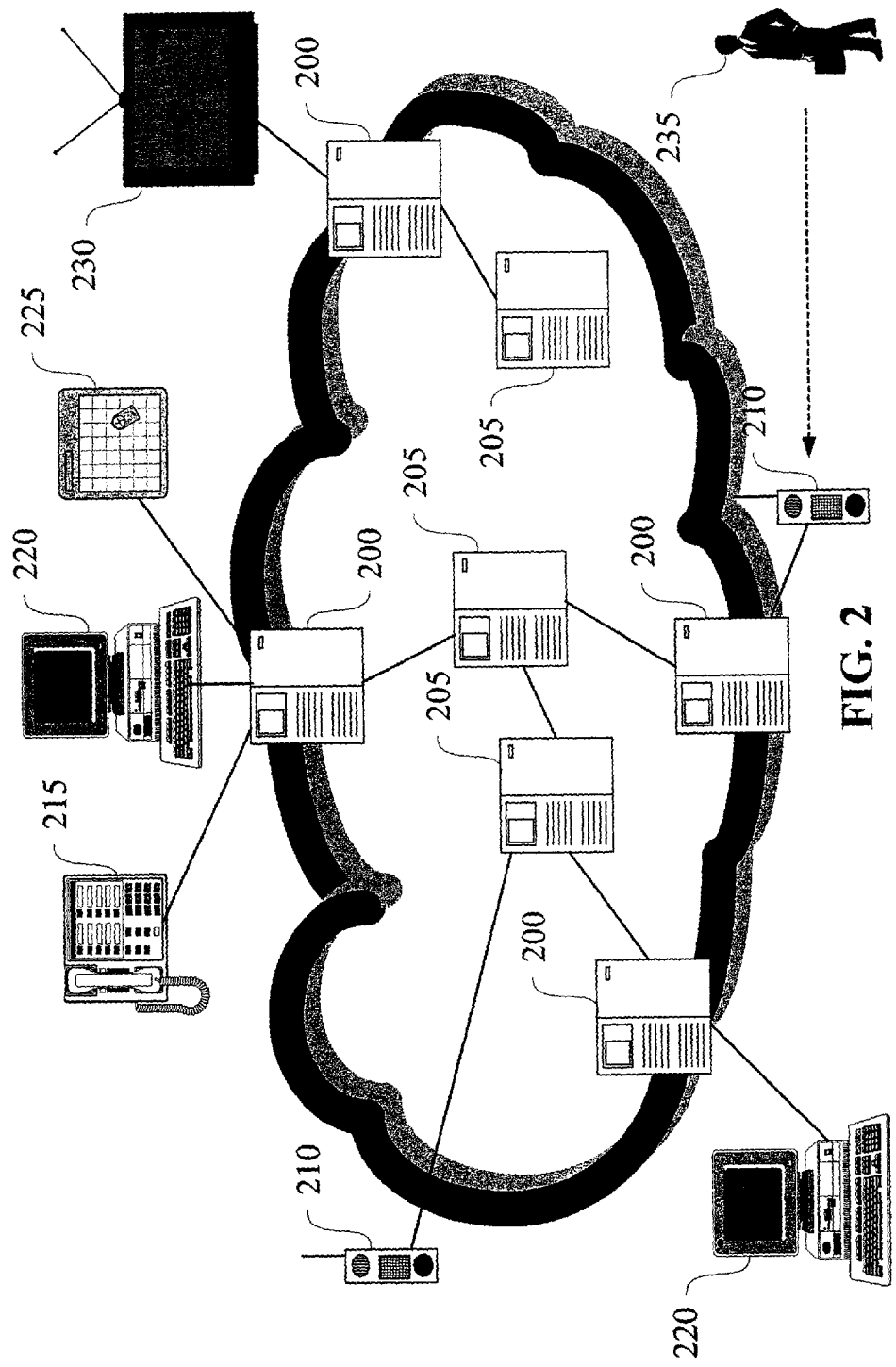
FIG. 2 is a perspective view illustrating a computing environment in accordance with the present invention.

FIG. 2 shows a typical configuration of a computing environment used in a preferred embodiment of the current invention. The computing environment includes edge servers 200, content hosts 205, mobile phones 210, smart phones 215, personal computers 220, tablets 225 and television appliances 230. Content hosts 205 store and serve content of various types, such as static and dynamic data, multimedia, and even code fragments. Mobile and stationary users 235 access this content via one or more heterogeneous client devices such as a mobile phone 210, smart phone 215, personal computer 220, tablet 225, and television appliance 230, which communicate either directly with the content hosts 205 or via one or more edge servers 200. As illustrated in FIG. 2, a mobile user 235 may access the same content from multiple edge servers 200, using the same or different devices. Although illustrated as an individual person, it is contemplated that the term user may include a group of individuals.

Architecture Overview

Figure 3:
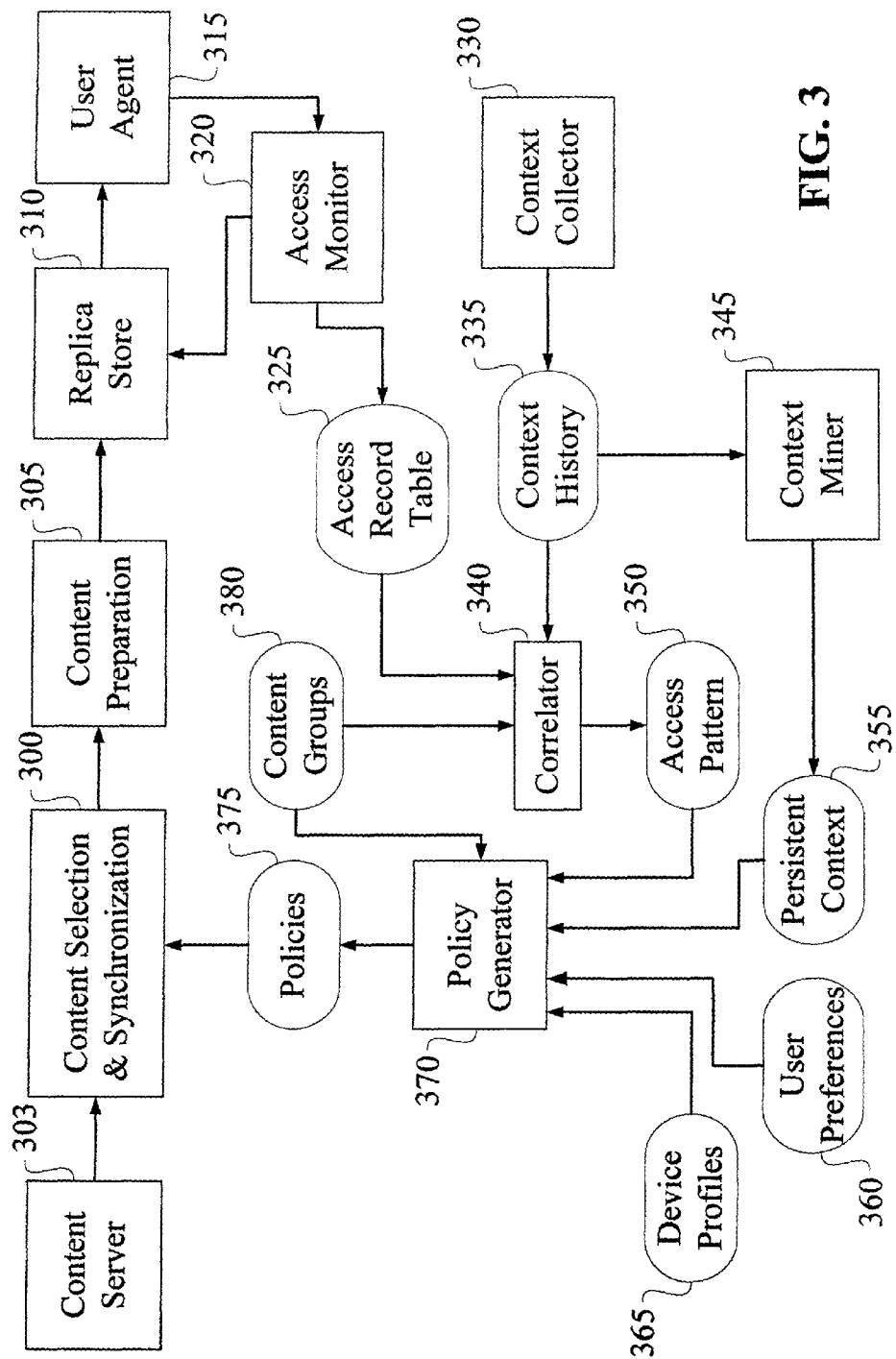
FIG. 3 is a flow chart illustrating an architectural overview of the present invention.

An architectural overview of a system for content pre-fetching and preparation in accordance with the present invention is shown in FIG. 3. A primary purpose of this system is to pre-fetch and prepare content based on policy information. The policy information is derived from several sources of knowledge relating to user behaviors.

To pre-fetch and prepare the content based on policy information, a preferred embodiment uses two sets of functional units. The first set of functional units is used for pre-fetching and preparing content using the policy table 375, and includes content selection and synchronization 300, content preparation 305, replica store 310 and user agent 315. The second set is used to generate pre-fetching and preparation policies to populate the policy table 375, and includes access monitor 320, access record table 325, context collector 330, context history 335, context correlator 340, context miner 345, access pattern 350, persistent context 355, user preferences 360, device profiles 365, policy generator 370, policies 375, and content groups 380. The policies table 375, which is described in more detail below with reference to FIG. 18, provides an interface between the first and second sets of functional units.

Pre-Fetching and Preparing Content

Content is stored on and managed by content server 303 running on content host 205. Content server 303 receives content requests either from user agent 315, possibly through replica store 310, or from content selection and synchronization unit 300, which is described below with reference to FIGS. 4 and 5. Content server 303 then processes the request, generates or retrieves the content satisfying the request and sends it back to the requester.

In a preferred embodiment, requests for content are sent to one or more content servers 303 by the content selection and synchronization unit 300. As its name implies, the content selection and synchronization unit 300 performs two functions: content selection—which is described with reference to FIG. 4, and content synchronization—which is described with reference to FIG. 5. Generally, the content selection function selects content for clients and makes the appropriate requests to content servers 303. The content synchronization function maintains the consistency of content between the content servers 303 and the replica stores 310. Each of these functions is controlled by one or more policies which have been obtained from policies table 375.

Policies table 375 comprises three major types of policies, i.e., content group definitions, pre-fetching policies and preparation policies. Content group definitions specify groups of content that are of interest to a particular user. In a preferred embodiment, content group definitions are entered in the system by an administrator or user. It is contemplated that content group definitions could be generated automatically by, for example, data mining techniques. Pre-fetching policies are utilized to inform the content selection and synchronization unit 300 that a set of content groups is to be pre-fetched and maintained at a set of replica stores 310. Pre-fetching policies trigger requests for content to be forwarded from the content servers 303 to the content selection and preparation unit 300. The content received by the content selection and preparation unit 300 is then forwarded to the content preparation unit 305. The preparation policies provide preparation instructions to the content preparation unit 305. Typical preparation instructions include transcoding directives assisting the preparation of content in a desired format. The preparation instructions may also instruct the content preparation unit 305 to bind services that will be needed to serve requests.

When the content selection and synchronization unit 300 receives content from content servers 303 as a result of a pre-fetching policy, the received content is forwarded to the content preparation unit 305, together with preparation policies. After the content is prepared in content preparation unit 305, the prepared content is transferred to replica stores 310. The role of a replica store 310 is to hold prepared content in anticipation of client requests. If a client requests a piece of content that has already been pre-fetched and is currently held in the replica store 310, the request is served from the cache of the replica store 310. If the desired content has not been pre-fetched, the replica store 310 forwards the request to the correct content server 303, on behalf of the user. A user agent 315, such as a Web browser, is typically employed to facilitate the interaction between a replica store and a user.

Policy Generation

The generation of policies commences with the access monitor 320. All of a user's requests for content are intercepted by the access monitor 320 before being forwarded to replica store 310. Generally, the role of the access monitor 320 is to track information regarding client requests that take place in the replica store 310. Access monitor 320 is described in further detail below with reference to FIG. 6. Access monitor 320 stores the information that it obtains in access record table 325. The access record table 325 is described in further detail with reference to FIG. 7. The context collector 330, described in further detail below with reference to FIG. 8, tracks contextual information such as user location and user calendar entries. One system for maintaining the context of users and their devices is described in co-pending U.S. patent application Ser. No. 09/479,821, filed Jan. 7, 2000, entitled "Method and Apparatus for Providing an Awareness-Service Architecture" (the "'821 application"), which is hereby incorporated by reference herein. Another system is described in co-pending U.S. Provisional Patent Application Ser. No. 60/306,314, filed Jul. 18, 2001, entitled "Method and Apparatus for Providing Extensible Scalable Transcoding of Multimedia Content" (the "'314 application"), which is hereby incorporated by reference herein. The context information from context collector 330 is stored in a context history table 335 which is described in further detail below with reference to FIG. 9. The correlator 340 performs a correlation to generate user access patterns. The correlator 340 utilizes the access information stored in the access record table 325 and information on user context history stored in the context history table 335. The access patterns generated by the correlator are then stored in access pattern table 350. The context history is also used by the context miner 345 to identify patterns in the data collected by the context collector 330 and stored in the context history table 335. For example, the context miner 345 might find that a given user is always in his or her office on weekdays, between 9:00 a.m. and 10:00 a.m. Any patterns that are identified by the context miner 345 are stored in a persistent context table 355.

User preferences are maintained in user preferences table 360. User preferences are typically provided directly by the users and contain information regarding the users' behavior, needs for specific content in a specific form, and when the users are in a specific context.

Device profiles are maintained in device profiles table 365. Device profiles table 365 includes information on the individual capabilities of the various client devices that may be utilized. A more detailed description of the device profiles table 365 is given below with reference to FIG. 15.

The device profiles 365, user preferences 360, persistent context 355, content groups 380 and access pattern 350 tables contain all of the information that is necessary to generate all of the policies that are stored within policies table 375. The act of generating the policies is performed by policy generator 370 unit and the resulting policies are stored in policies table 375.

It is contemplated that there may be one or more of each of the units illustrated in FIG. 3. Notwithstanding having duplicate units, their functionality remains the same. Furthermore, it is to be appreciated that there are many ways to distribute the units in a wide area network. For example, a content preparation 305 unit could either reside within content selection and synchronization unit 300 or with replica store 310. Additionally, replica store 310 could either run on edge server 200 or on any client device 210, 215, 220, 225, or 230, with a user agent 315.

It is also contemplated that policies may be manually supplied by administrators or users.

Content Selection

Figure 4:
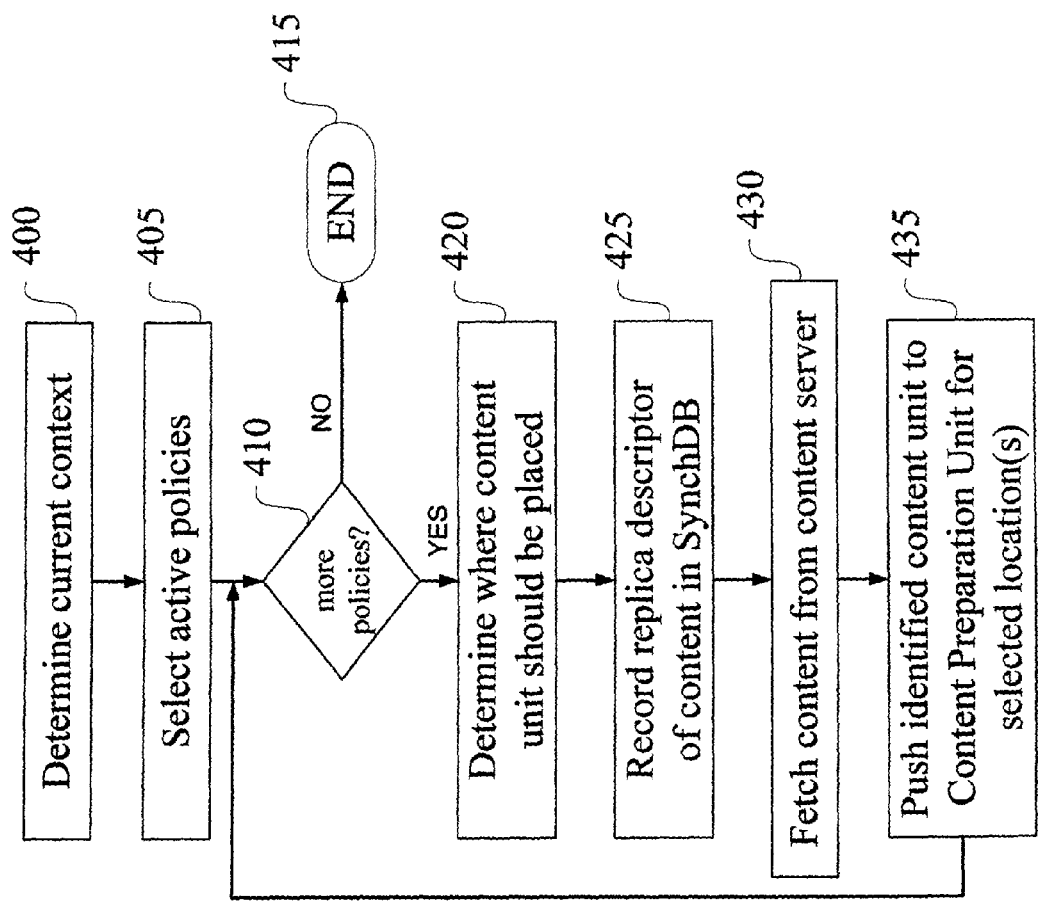
FIG. 4 is a logical flow diagram illustrating a process of content selection in accordance with the present invention.

One function of the content selection and synchronization unit 300 is that of content selection. The process of content selection is illustrated in FIG. 4. This process occurs for each user of the system and begins in step 400 with a determination of the user's current context. The process continues in step 405 with a selection of active policies from the policies that are stored within policies table 375. Determining which policies within policies table 375 are currently active requires a number of checks. First, a check is made to determine whether the current time is within a time range associated with the policy in question. Second, a check is made to determine whether the current context (obtained from the context collector 330) is applicable to the policy in question. Third, a check is made to determine which content items (and therefore content groups) that the user is currently viewing. These checks are performed only if they are appropriate for the particular policy in question (e.g., if the policy has an associated time range and/or context).

The active policies identified in step 405 are processed in steps 410 through 435. Step 410 selects the next active policy. In step 420, a determination is made as to where the content group associated with the policy should be placed in the network. In step 425, the replica descriptor of the content is stored in the SyncDB table 1900. SyncDB table 1900, illustrated in FIG. 19, is a table which is internal to the content selection and synchronization unit 300 and not visible to any other functional unit. In step 430, the applicable content is fetched from the appropriate content server 303 and, in step 435, the content is pushed into the content preparation unit 305 associated with the applicable network location. Upon completion of step 435, the process returns to step 410 to determine whether any more active policies exist. Once there are no further active policies, the process is ended in step 415.

The particular order of the steps illustrated in FIG. 4 may vary if necessary. For example, it is contemplated that step 425 may need to occur after step 435 if, for example, the complete replica descriptor recorded in step 425 requires information which is only available from the replica store 310 after the content has been pushed in step 435 to the applicable network location. In this case, the proper order would be steps 420, 430, 435, and finally 425.

It should be noted that the process described above with reference to FIG. 4 is one based upon polling. That is, the system periodically checks for the user's current context and active policies. Alternatively, the system could be written in an event-driven fashion. For example, as the user's context changes, the context selection and synchronization unit 300 could be informed of the event and the context change could trigger a check for active policies. Similarly, when a policy is scheduled to become active (or inactive), an event could cause the system to push content (or remove it) as appropriate. Furthermore, when a content item is created, published, or updated, the content server 303 could inform the content selection and synchronization unit 300. Such an event could then map the content item to the appropriate content group and update the content group information. Such a design offers the standard advantages, such as performance and scalability, of event-driven systems as compared with their polling counterparts.

Content Synchronization

Figure 5:
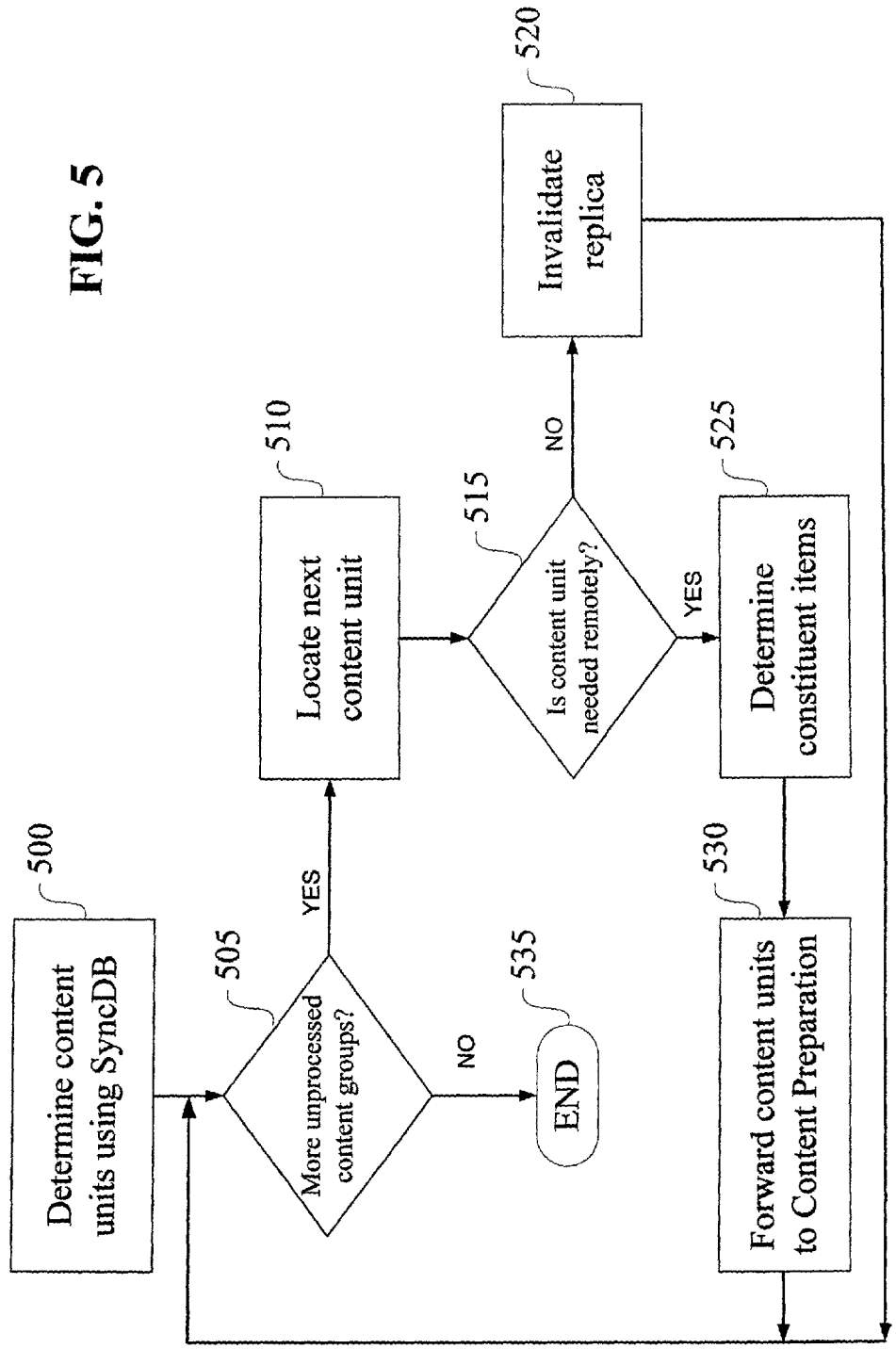
FIG. 5 is a logical flow diagram illustrating a process by which content synchronization is performed in accordance with a preferred embodiment of the present invention.

Content synchronization in the content selection and synchronization unit 300 is the process that maintains consistency between content replicas in replica store 310 and a master copy on the content server 303. FIG. 5 illustrates a process by which content synchronization is performed in accordance with a preferred embodiment of the present invention. The content synchronization process is triggered by updates of content on the content server 303. In step 500, SyncDB 1900 (see FIG. 19) is analyzed to determine a set of rows that needs to be processed. This set consists of all the rows corresponding to the content groups that have been updated. All of the rows determined in step 500 are iterated through the process in steps 505 through 530 in accordance with the following description. When no more unprocessed content groups exist, the synchronization process ends as indicated in step 535.

Once the total amount of content groups are determined in step 500, in step 505 the process determines whether additional unprocessed content groups exist. If additional unprocessed content groups do exist, in step 510 the next row in SyncDB 1900 to be processed is located. In step 515, a determination is made as to whether the content group identified by the content group identification column 1905 should still be kept in the remote replica store identified by the replica descriptor column 1910. This determination is made by checking whether the expiration time column 1915 contains a value greater than the current time. If the expiration time 1915 indicates that the content group is no longer needed, the copy of the content group in the replica store is invalidated in step 520 and the corresponding row in SyncDB 1900 is purged. Otherwise, the synchronization process proceeds to step 525. In step 525, the set of all content items currently belonging to the content group is determined. The difference between this current set and the set in the replica store 310 is then calculated by examining the replica descriptor column 1910. This process identifies content items that have been added, modified, or deleted. In step 530, the content items in the calculated difference are fetched from the content server, if necessary, and forwarded to the content preparation unit 305.

In the current embodiment of the present invention, content synchronization is triggered by content updates on the content server 303. In an alternative embodiment of the invention, content synchronization may be triggered by demand requests at a replica store 310. Further, in step 500, the set of rows in SyncDB 1900 that need to be processed consists of the rows that simultaneously satisfy the following two conditions. First, the content group identification column 1905 identifies a content group to which the demanded items belong. Second, the replica descriptor column 1910 identifies the replica store to which the demand requests were directed.

In another embodiment of the present invention, content synchronization is triggered by lapses of fixed time intervals. Further, in step 500, all of the rows in SyncDB 1900 need to be processed. Alternatively, it is contemplated that content synchronization may also be triggered by a combination of two or more of the above events.

Access Monitor

Figure 6:
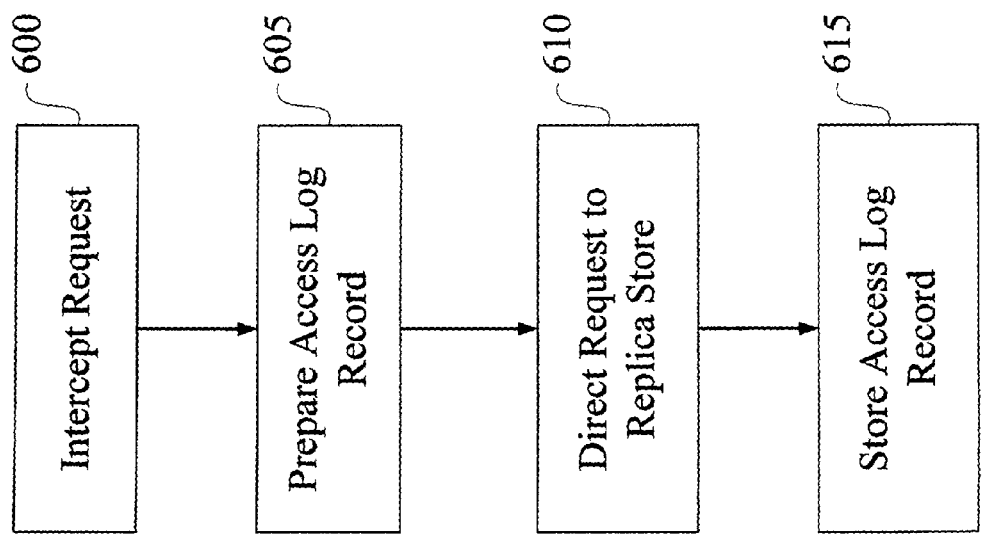
FIG. 6 is a logical flow diagram illustrating the functions performed by the access monitor in accordance with the present invention.

Referring now to FIG. 6, there is illustrated a flow diagram of the functions performed by the access monitor 320 in accordance with the present invention. As illustrated in FIG. 6, the access monitor 320, in step 600, must first intercept a request. Standard interception techniques are known to those having ordinary skill in the art and are used in the file systems community and in the web community. After intercepting a request, the access monitor 320, in step 605, prepares an entry for the access record table 325 based upon information contained in the request. For both file and web accesses, identifying the information about the request is straightforward. However, identifying the information about the requester requires an authenticated user. In the absence of an authenticated user, the most one can expect to identify is the physical device from which the request was made. Further details regarding the access record table 325 are provided below with reference to FIG. 7. In step 610, the access monitor 320 redirects the request to the replica store 310. Finally, in step 615, the access monitor 320 stores the access log record in access record table 325.

In an alternative embodiment, the access monitor 320 could monitor the network associated with the replica store 310, thereby listening to requests intended for the replica store 310 and recording the necessary information. Such a process improves the latency of requests.

Access Record Table

Figure 7:
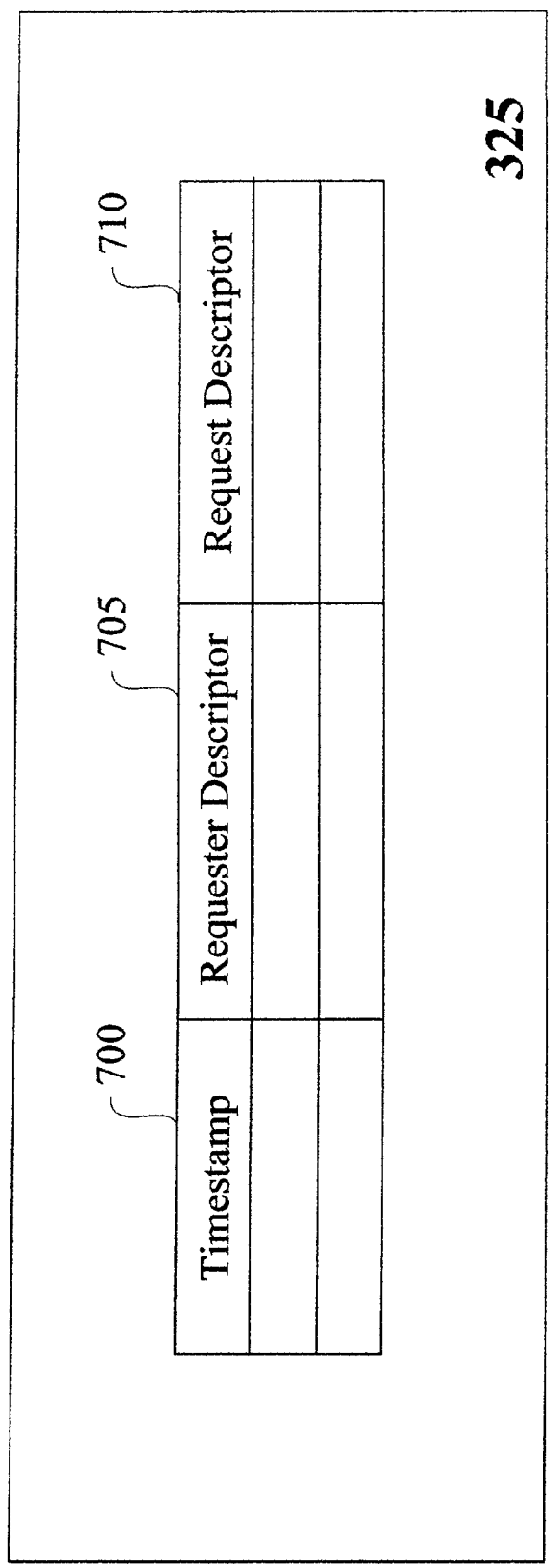
FIG. 7 illustrates an exemplary record within an access record table in accordance with the present invention.

FIG. 7 illustrates an exemplary record within access record table 325 in accordance with the present invention. As illustrated in FIG. 7, the access record table 325 contains three columns of information having the following column headers: timestamp 700, requester descriptor 705, and request descriptor 710. The information stored in the timestamp column 700 indicates the time at which the request was made. The information stored in the requester descriptor column 705 includes, but is not limited to, the identity of the user who made the request, the name of the requesting program, the parameters associated with the request, or the device on which the request was generated. The information stored in the request descriptor column 710 includes, but is not limited to, the specific content item requested as indicated by its filename, URL, or the like, as well as the request parameters.

It is contemplated that the information stored in the request descriptor column 710 could be combined with the information stored in the requester descriptor column 705. Additionally, it is contemplated that the access monitor 320 could lookup the user's current context and include this information in one or more columns in the access record table 325. This would ease the burden on the correlator 340.

Context Collector Architecture

Figure 8:
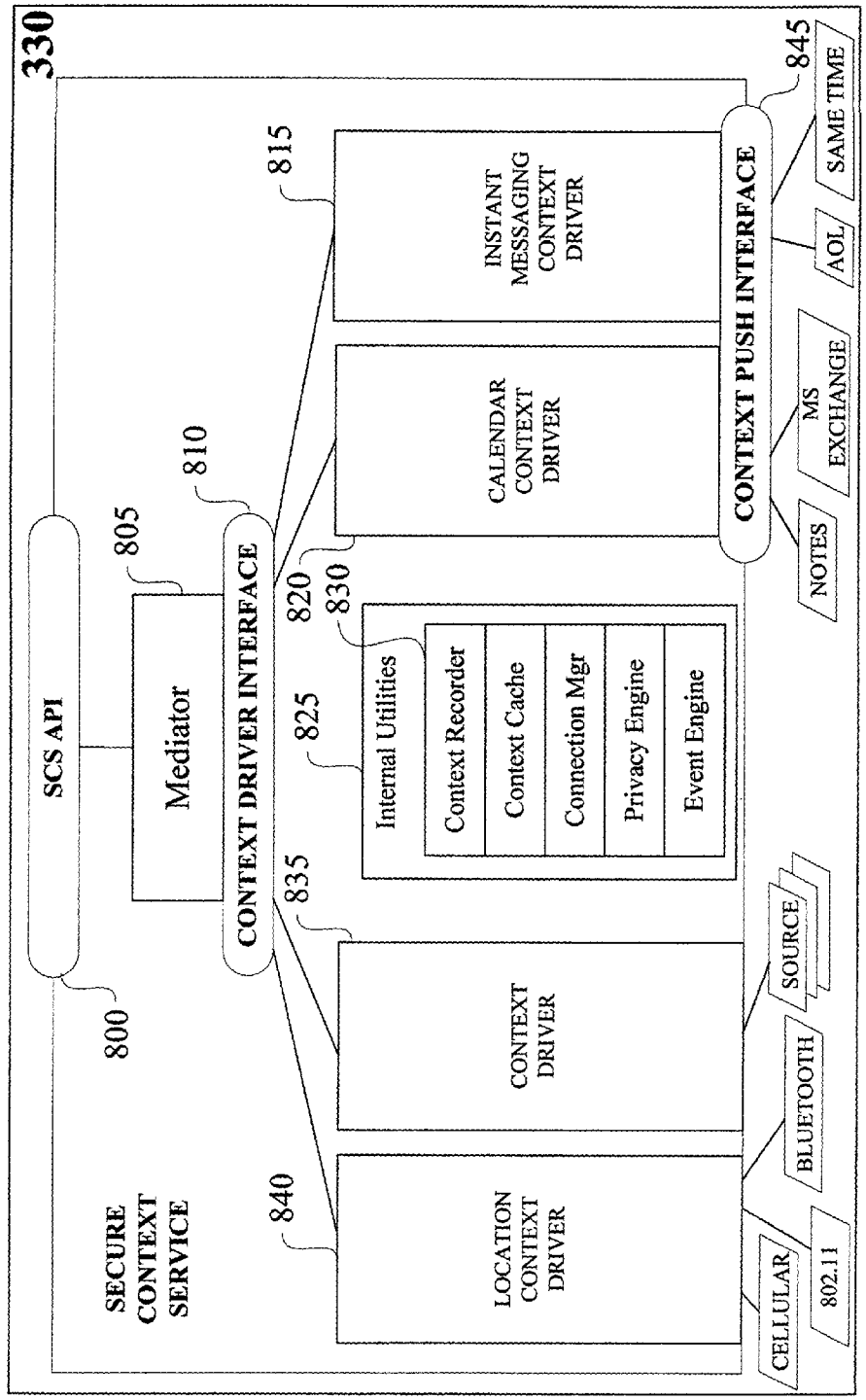
FIG. 8 is a block diagram illustrating the components of a context collector in accordance with the present invention.

FIG. 8 illustrates the components of a context collector 330 in accordance with an embodiment of the present invention. One system for maintaining context information is described in U.S. Provisional Patent Application Ser. No. 60/306,314, entitled "Method and Apparatus for Providing Extensible Scalable Transcoding of Multimedia Content," filed Jul. 18, 2001 (the "'314 application") which is hereby incorporated by reference herein. Another system for maintaining the context of users and their devices is described in co-pending U.S. patent application Ser. No. 09/479,821, filed Jan. 7, 2000, entitled "Method and Apparatus for Providing an Awareness-Service Architecture" (the "'821 application"), which is hereby incorporated by reference herein.

In an exemplary embodiment, the present invention uses a scaleable secure context service as a context collector 330. It is to be appreciated that other types of context collectors may be utilized. For example, in the '314 application context is collected from context drivers and reported in response to queries. The present invention uses historical context which is recorded in a context history table 335 as illustrated FIGS. 3 and 9. If a context service does not generate historical context information, then either an external function can be added to receive transient context and record it in a context history table 335 or the collector could be modified to generate the context history table 335 directly. Additionally, if a context service records historical context in some other format, software may be added to rewrite the context as necessary.

As shown in FIG. 8, a context collector 330 receives requests via a secure context service application programming interface (SCS API) 800. These requests are serviced by a mediator 805 that aggregates data from various context drivers 815, 820, 835, and 840. Communication with the various context drivers 815, 820, 835, and 840 occurs via a context driver interface 810. The context service also contains a number of internal utilities 825 which are described in detail in the '314 application, with the exception of context recorder 830. Context recorder 830 performs the function of recording information into the context history table 335. The context drivers 815, 820, 835, and 840 can make use of the internal utilities as needed.

The location context driver 840 includes three sources of location data: (1) a cellular source such as, for example, a cellular telephone system, (2) a wireless local area network (LAN) source such as, for example, an 802.11 network, and (3) a second wireless personal area network (PAN) source such as, for example, a Bluetooth network. It is contemplated that an additional source of location data could be acquired from a device enabled with a network and a global positioning system (GPS) unit. When a request for location context arrives, the location context driver 840 queries one or more context sources for the required location information. It is contemplated that the location context source could, alternatively, send or push location context information to the location context driver 840. As part of the location context, the location context driver also returns the identity of the device that was used to sense the location. The device identification information could be recorded in the source field 930 of the context history table 335, as illustrated in FIG. 9. For example, if the location context is sensed using a cellular infrastructure, the identity of the cellular telephone that was sensed would be returned to the location context driver 840 within the location context. If location context is sensed using an 802.11 infrastructure, the media access control (MAC) address of the card sensed could be returned. For an 802.11 infrastructure, with additional software support, information regarding the particular device that the card is plugged into could also be returned.

With continued reference to FIG. 8, the calendar context driver 820 and instant messaging context driver 815 are illustrated. These context drivers receive context information from various sources. For example, the calendar context driver 820 obtains calendar context information (such as when a particular subscriber is scheduled to attend a meeting) directly from a Lotus Notes calendar context source. Alternatively, it is contemplated that other calendar programs may be utilized such as Microsoft Exchange or any other calendar system, to supply the necessary information to the calendar context driver 820.

The instant messaging context driver 815 maintains information regarding a subscriber's instant messaging status. For example, the instant messaging context driver 815 is configured to obtain instant messaging status information from America On-Line (AOL), Sametime or any other instant messaging type of program. Each of the context sources sends context information via a context push interface 845. It is also contemplated that programming associated with the context drivers could be written to permit the context drivers to query their respective context sources as needed.

The mediator 805 is configured to use the context recorder 830 to record context information in the context history table 335 just before returning the query. The SCS API 800 has been augmented to allow context information to be recorded in the context history table 335 only, but not returned to the requester. It is contemplated that the context history table 335 may be populated in other ways, for example, the context collector could be modified to record all context information available to it independent of any requests.

In accordance with an embodiment of the present invention, the context service is queried to obtain the desired context information. Context information can be static or dynamic information, and requests for context information may be one time requests, event driven, or continuous. In each of these cases the context information may be recorded. It is contemplated that one or more parts of the context collector 330 may be modified to use the context recorder 830. Recording the context information in the context collector 330 may affect the granularity of the information available in the context history table 335. Further, useful data can be lost if it is filtered out before being recorded in the history table. The present invention allows users to adjust the granularity of the context history through the augmented SCS API 800.

Another function of the mediator 805 is to direct simple requests to the appropriate context driver such as drivers 815, 820, 835, and 840. For example, a request for a subscriber's location would be directed to the location context driver 840 and a request for a subscriber's instant messaging context would be directed to the instant messaging context driver 815. Additionally, another function of the mediator 805 is to aggregate different types of context to more efficiently process more complex requests. For example, a request regarding whether a subscriber is actually attending a meeting that appears on his or her calendar could be serviced by the mediator 805. However, this request would require the use of more than one of the context drivers shown in the present architecture. For this example, the mediator 805 would need to query both the calendar context driver 820 and the location context driver 840 and then compare the location of the current meeting with the subscriber's present location. If the two locations are the "same", then the request might be answered in the affirmative; if not, then the request would be answered in the negative. However, defining the term "same" with regard to such a query is a complex issue with many solutions. For example, cellular tower A may cover an office which has GPS coordinates (X,Y,Z). If these two location values are reported by two separate sources, the system must recognize that these two different representations are not inconsistent. One possible way to resolve the issue is to require the requester to specify how close the locations must be to be considered the same. Additionally, the system may include information regarding the dimensions of rooms available to it so that when a request arrives that requires the system to determine if something is inside or outside a room (or any place) it is capable of doing so.

It is contemplated that the individual context sources could aggregate context data to produce a single view of one type of context data. For example, an 802.11 context aggregator could collect 802.11 data from many access points. The 802.11 context aggregator could then analyze that data to determine a single location estimate. Requests made to the 802.11 context aggregator would then result in a single location estimate, possibly with associated quality of information estimates. Similarly, in a push scenario, the single location information could be sent to the context driver or to a downstream aggregator.

It is further contemplated that another individual context source, from the context service's perspective, could itself aggregate context data from multiple different sources to define a new type of context. Additionally, context aggregators could be arranged in a hierarchical fashion, arbitrarily allowing more complex context data to be created. Thus, an architecture could be designed to address factors such as scalability, quality of information, administrative control, and so forth.

Context History Table

FIG. 9 illustrates various types of information that may be stored in the context history table 335. A row is created for each individual context history entry. The context history table 335 is designed to store all types of context history information. As illustrated, the column headings include time stamp 900, context type 905, context attributes 910, duration 915, context event 920, supplier 925, source(s) 930, and subject(s) 935. Additional columns may be added to accommodate the entry of additional data, or, alternatively, a subset of the columns illustrated in FIG. 9 may be used. Notwithstanding the fact that only a subset of the columns may be used, each entry should include at least the following data: a timestamp 900, context type 905 and context attributes 910. The timestamp column 900 contains information regarding the date and time that the context event occurred. If the event has a duration (i.e., length of time), then the time and date which is recorded in column 900 is representative of the start of the context event. The end time or some other fixed point during the event could also be recorded.

The context type column 905 contains information regarding the type of context. Context information recorded from the context recorder 330 could contain location, calendar, or instant messaging information.

The context attributes column 910 contains actual context information such as the GPS coordinates or the fact that someone is on a business trip.

The duration column 915 contains information which indicates the length of time that the context event took or is scheduled to take.

The context event column 920 contains information which describes the event with additional specificity. For example, when combined with information from the calendar context driver 820, the event might be labeled as, for example, a meeting, a conference call, vacation, or travel. The location context driver 840 may provide information which will cause the event information in column 920 to be, for example, room 205, Atlanta, or Poughkeepsie. GPS context events could be labeled as GPS, followed by the coordinates.

The supplier column 925 contains information which indicates the owner of the source of the context data. The source column 930 contains information which indicates the origin of the data. For example, the supplier of context received via a cellular telephone could be Verizon Wireless or Sprint, and the source could be the cellular tower sensing the telephone and the telephone sensed. For some context types the source information 930 will include information regarding the device that generated the context source information. In another example, where the context type is identified as virtual context in column 905, and context event column 920 contains information which indicates that the context event is e-mail, the context source could be a laptop computer, Blackberry, a two way pager, or any other device where the context subject accesses e-mail. In a facility which is wired for tracking individuals, the source of meeting information could be the room where the collection of people were sensed.

The subject(s) column 935 contains information indicating the person, persons, object, or objects that the context event is reporting about.

It is contemplated that additional columns may be included to contain additional information that can assist in interpreting the context. For example, when the context type 905 is location information, the additional information may indicate whether the origin is a global positioning system (GPS), a cellular network, an 802.11 network, a local area network (LAN) or a Bluetooth network.

Correlator

The correlator 340 takes information from an access record table 325 and a context history table 335 as input and generates an access pattern 350 for each combination of context attribute values. Examples of context attribute values include access location and access device information. Because user behavior may demonstrate different characteristics under different circumstances, the present invention models access patterns separately for different context attributes.

Figure 10:
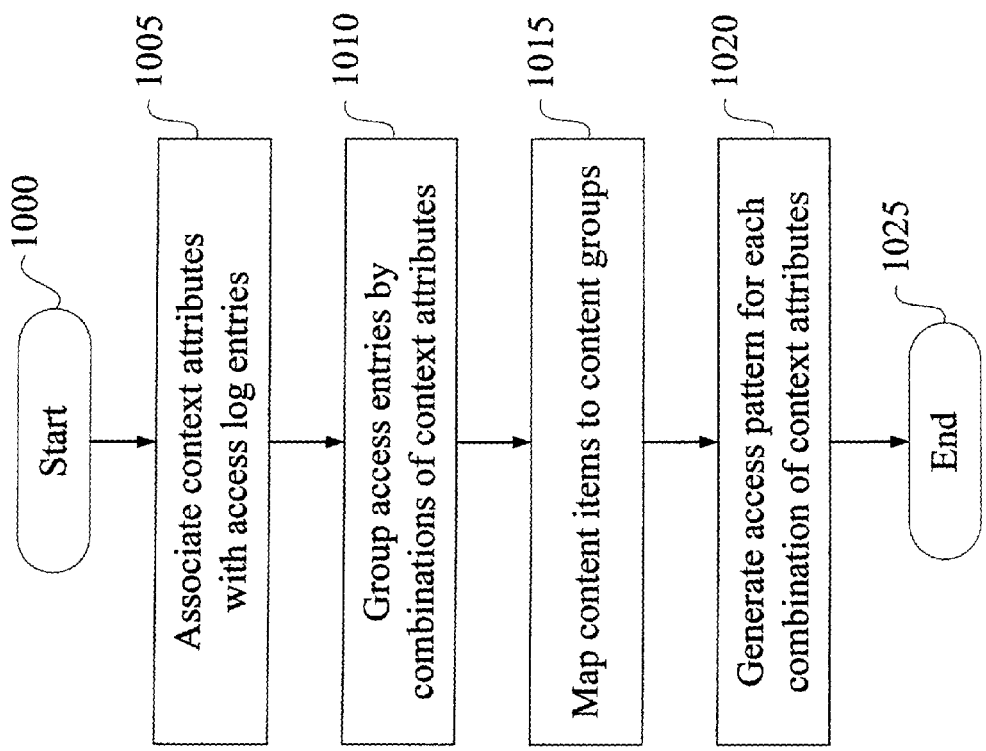
FIG. 10 is a logical flow diagram illustrating the steps associated with the use of the correlator in accordance with an embodiment of the present invention

FIG. 10 is a logical flow diagram illustrating the steps associated with the use of the correlator 340, in accordance with an embodiment of the present invention. Use of the correlator starts at step 1000. In step 1005, each entry in the access record table is annotated with the context attribute values at the time of access, by correlating the timestamps associated with the entries in the access record table 325 and those associated with the entries in the context history table 335. In an alternate embodiment in which the access monitor records context information, this step would be unnecessary.

In step 1010, the annotated entries obtained in step 1005 are grouped by context attribute values. For each combination of context attribute values, the associated entries are grouped together and arranged in chronological order. In step 1015, the content item in each entry is mapped to the content group to which the content item belongs, in accordance with the specification of the content groups 380. If a content item belongs to more than one content group, the original entry is replaced by multiple entries, each representing a content group. In step 1020, an access pattern is generated for each combination of context attribute values. The access pattern data structure will be discussed in detail below with reference to FIG. 11. The method of generating an access pattern will be discussed in detail below with reference to FIG. 12.

In a preferred embodiment of the present invention, access patterns are modeled at the level of content groups. It is contemplated that access patterns may also be modeled at the level of individual content items.

Access Pattern

Figure 11:
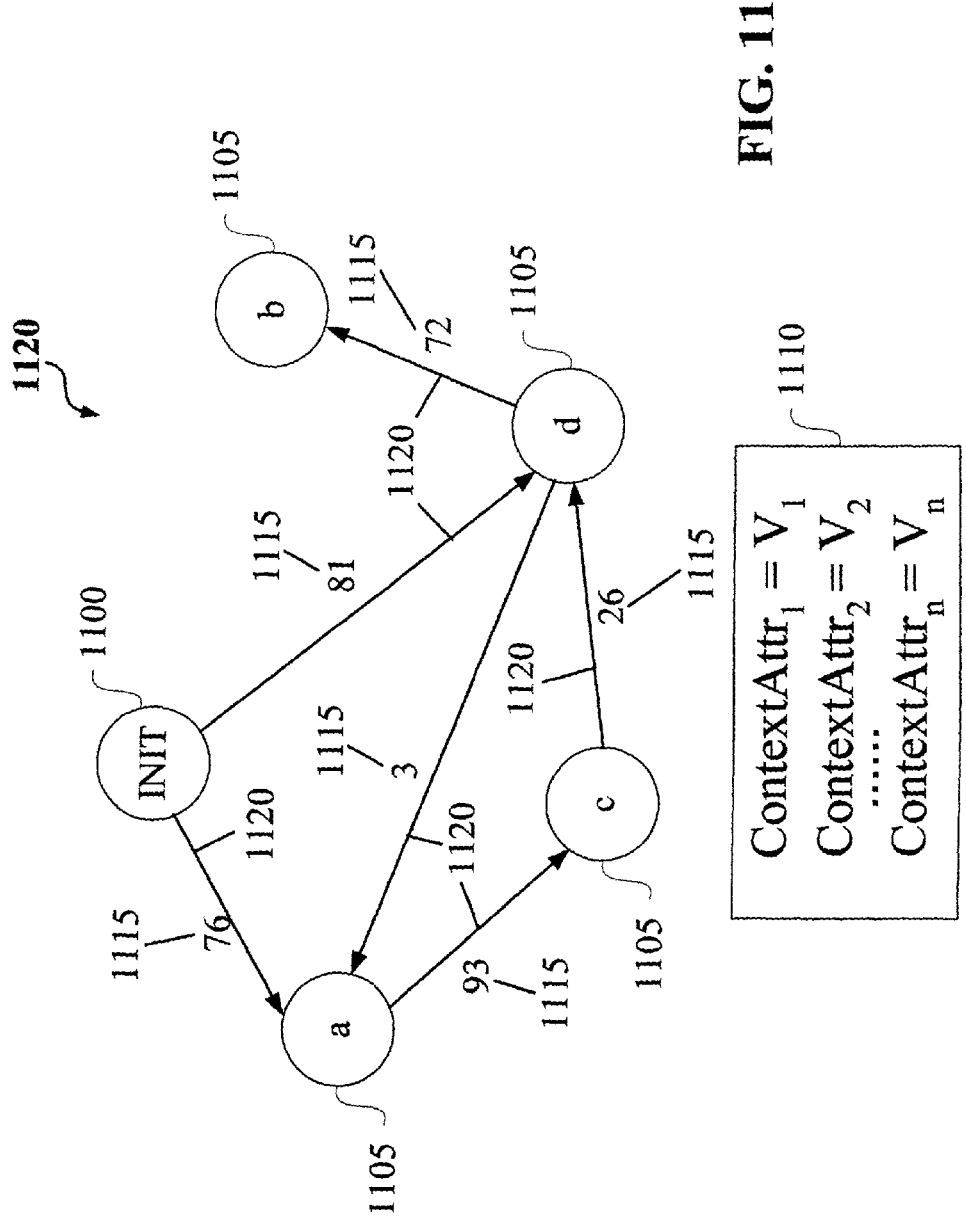
FIG. 11 illustrates the access pattern data structure

FIG. 11 illustrates the access pattern 350 data structure. The access pattern data structure is maintained for each combination of context attribute values 1110. The access pattern is represented as a directed graph composed of nodes 1100, 1105 and arcs 1120. One of the nodes, called the init node 1100, is a special node that represents the beginning of a series of correlated accesses. Other nodes, called content nodes 1105, represent a particular content group and are labeled by the respective content group identification. The arcs 1120 in the access pattern represent the interrelationship between content accesses. Accesses to two content groups are considered related if they occur close to each other in a timeline. Each arc is weighted by a number 1115 that indicates the number of times the relationship has occurred. For example, an arc from content node a to content node c, with a weight of 93, indicates that there have been 93 times when content group c is accessed shortly after content group a is accessed. An arc from the init node 1100 to content node a, with a weight of 76, indicates that there have been 76 times when an access to content group a starts a series of related accesses.

Generate an Access Pattern

FIG. 12 is a flow chart illustrating the process by which an access pattern 350 is generated for a specific combination of context attribute values, in accordance with a preferred embodiment of the present invention. The input to this process is a series of access records arranged in chronological order, where each record describes the time of access and the content group being accessed. This process has a parameter, called the relationship window, that defines a time interval such that accesses which occur within this interval are considered related.

The process starts at step 1200. In step 1205, the init node 1100 is created if it is not yet present. In steps 1210 to 1245, the input access records are iterated through and the access pattern 350 is updated accordingly. In step 1210, a determination is made as to whether any additional unprocessed access records exist. If no additional unprocessed access records exist, the process is ended, as indicated by step 1215. If additional unprocessed access records do exist, in step 1220 the next access record to be processed is located. In step 1225, a content node 1105 for the content group identified in the access record is created, if necessary. In step 1230, the set of access records that precede the current access record and whose timestamp is within the relationship window of the current record's timestamp is computed. In step 1235, a determination is made on whether the set computed in step 1230 is empty. If the set is empty, the process proceeds to step 1240. Otherwise, the process proceeds to step 1245. In step 1240, if there is no arc yet from the init node 1100 to the node for the current content group, an arc with a weight value equal to one is drawn. Otherwise, the weight value associated with the arc is increased by one. In step 1245, for each content group identified by an access record in the set, an arc is drawn from that content group to the current content with a weight of one if no arc exists; otherwise, the weight associated with the arc is increased by one. According to a preferred embodiment of the present invention, the time of access and the relationship window are represented in physical time. It is also contemplated that the time of access and the relationship window may also be represented in logical time.

Context Miner

Figure 13A:
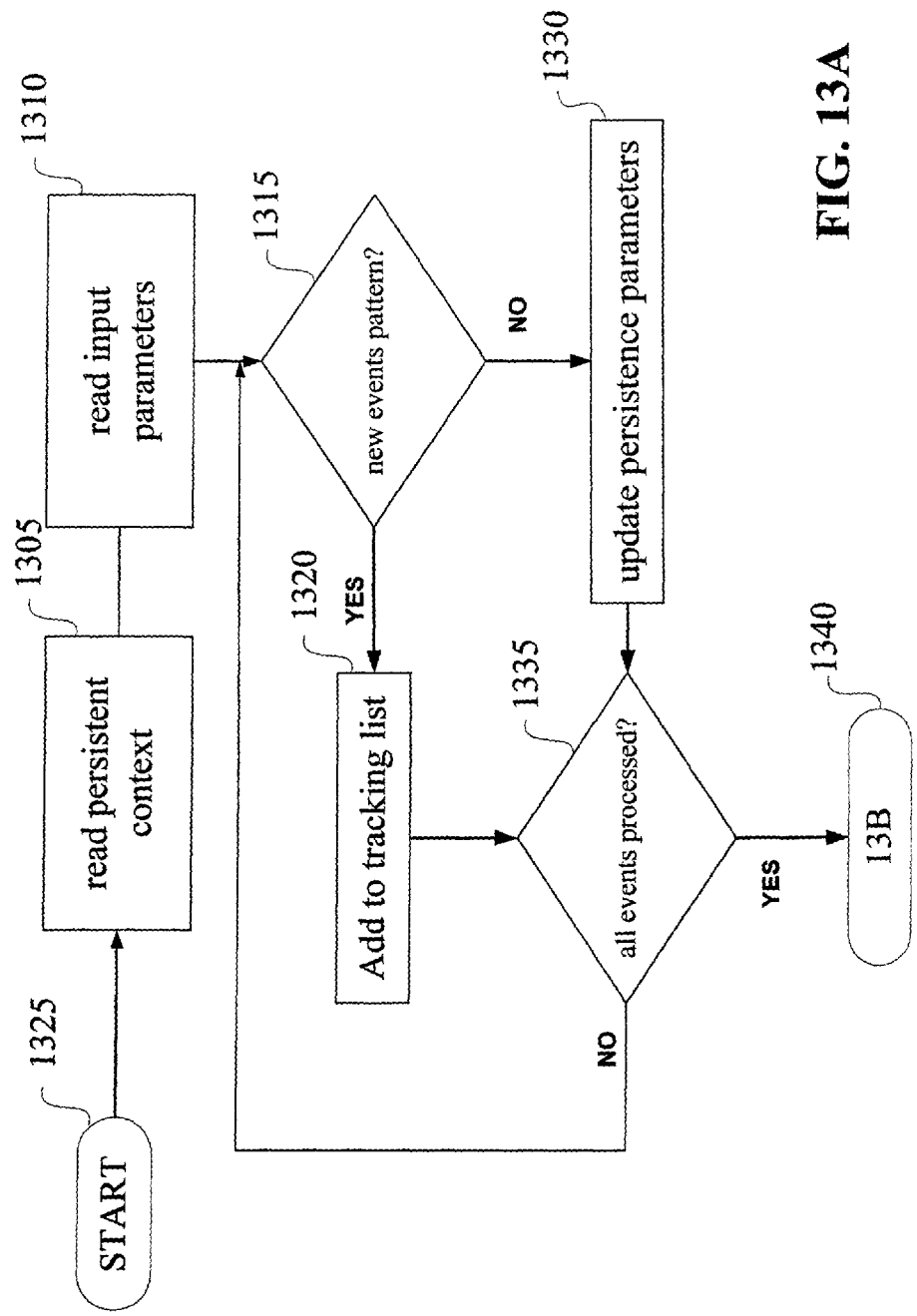
FIGS. 13A and 13B, flow diagrams are illustrated to indicate the manner in which persistent context is generated from the context history table.
Figure 13B:
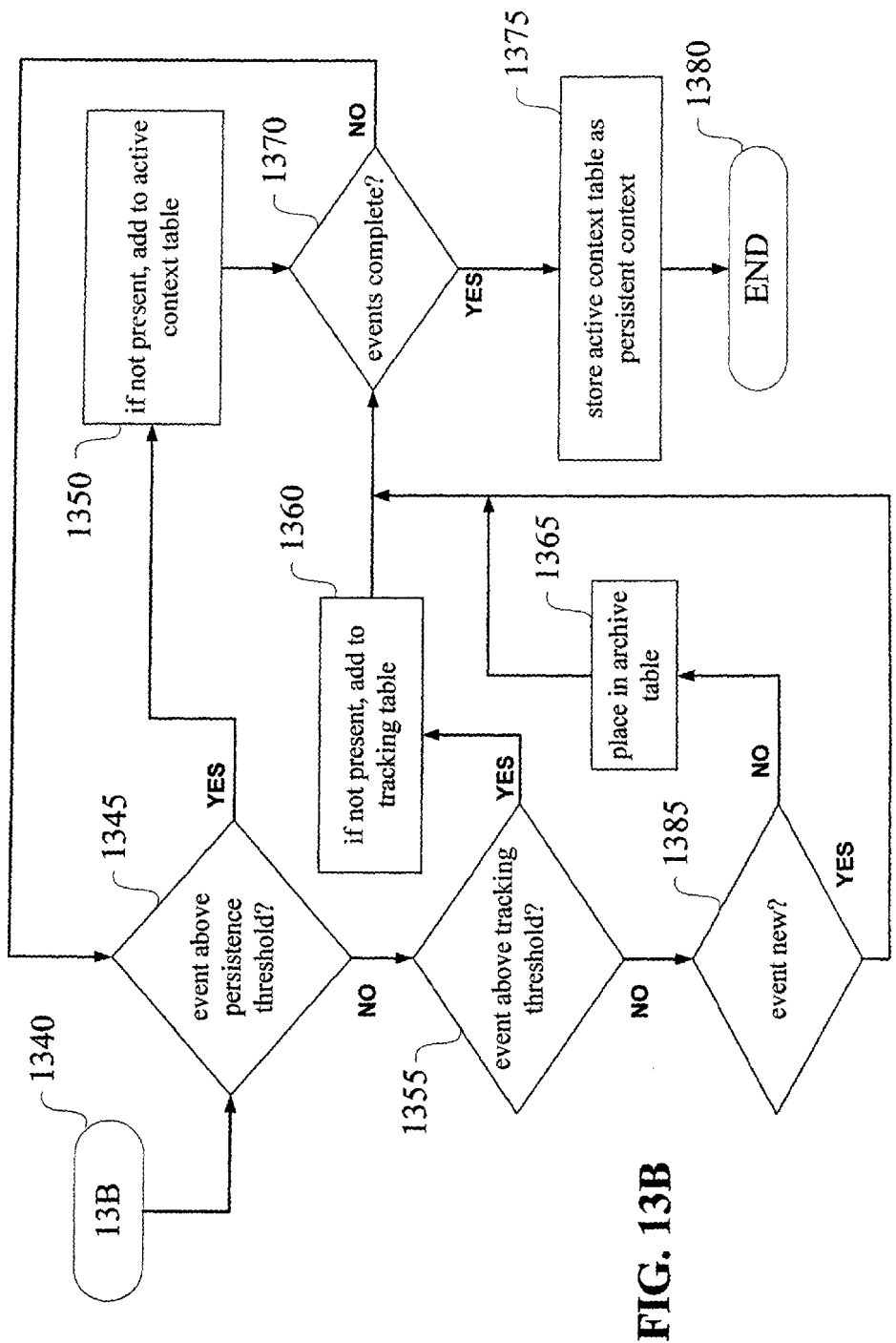

Referring now to FIGS. 13A and 13B, flow diagrams are illustrated to indicate the manner in which persistent context is generated from the context history table 335. The context miner's 345 job is to mine the historical context recorded in the context history table 335 to extract the persistent context. Data mining is a well known technique for extracting interesting information from a large volume of data. Data mining is used by the context miner 345 to reduce the context information stored in the context history table 335 to persistent context. Persistent context is stored in the persistent context table 355.

Returning to the flowchart illustrated in FIG. 13A, the context miner 345 starts reading, in step 1305, the persistent context table 355 to initialize an active context table (an internal table) in its memory with the persistent context table 355. The active context table now contains all of the persistent context events that have been previously identified and the statistics or characteristics associated with these events. Next, in step 1310, the context miner 345 reads the input parameters which are the control variables that determine, for example, the sensitivity of the mining algorithms, the frequency that is required, and a tracking table (an internal table).

Generally, the next part of the algorithm reads the context history table 335 and updates the statistics for all previously identified events as well as identifying potential candidates for new events. This portion of the algorithm is performed in a loop. The tracking table, which resulted from the input parameters which were read as input in step 1310, contains those context events which might be of interest.

More specifically, in step 1315, the next entry of the context history table 355 is read and checked to determine whether it represents a new event pattern. If this context history entry represents a new event pattern, it is added to a tracking list in step 1320. A new context event indicator in this tracking list entry is marked so that it will remain in the tracking list long enough to collect enough observations to determine whether it represents persistent context or an event which should be tracked. As indicated in step 1315, if the current entry from the context history table 355 represents a previously existing event pattern, the parameters associated with this event are updated in step 1330. In step 1335, a determination is made as to whether all events were processed. If all events were not processed, the process begins again at step 1315. This loop is repeated until there are no more events in the context history table 335, at which point the process continues with step 1340 illustrated in FIG. 13B.

The part of the algorithm shown in FIG. 13B identifies the persistent context and the items which need to be tracked. More specifically, the algorithm considers all of the items in the active context table and the tracking table as a single set of events. The process starts with the active context table and applies steps 1345 through 1370 to each event until all events in both tables are processed. It is worth noting that the tracking table, which is internal to the context miner 345, contains the same entries as the active context table with the addition of the new context event indicators. Both of these tables have the same information as the persistent context table 355. The events in the tracking table have either not occurred with high enough frequency to be considered persistent context or are new.

With continuing reference to FIG. 13B, which begins with step 1340, in step 1345 the next event is read to determine whether the event is above the persistence threshold. If the event is above the persistence threshold, in step 1350 it is moved to the active context table, if it is not already present. Note that, for events which are already in the active context table, this step does not accomplish anything. However, if the event being examined is in the tracking list, it is removed from the tracking list and added to the active context table. In step 1370 a determination is made as to whether there are any additional events to process. If there are additional events, the process continues at step 1345 and reads the next event from the context history 335.

Returning to step 1345, if the event being examined is not above the persistence threshold, a determination is made, in step 1355, as to whether the event is above the tracking threshold. If the event is above the tracking threshold, the event is moved to the tracking table in step 1360, if the event is not already present in the tracking table. Note that for events in the active context table, step 1360 removes the event from the active context table. For events which are already in the tracking table, step 1360 has no effect. If the event being examined is not above the tracking threshold, in step 1385, a determination is made as to whether the event is considered new (i.e., has the new event time out expired). If the event is no longer considered new, it is moved into the archive table in step 1365. Step 1365 removes the item from either the active context table or the tracking table, as appropriate. Returning to step 1385, if the event is still considered new, the algorithm proceeds, in step 1370, to check whether there is another event to process. If there is an additional event, then the algorithm returns again to step 1345. If there are no additional events to process, in step 1375 the active context table is stored as the persistent context table 355, replacing the existing table, and the tracking table is stored. The process associated with the context miner 345 ends at step 1380.

It is contemplated that, in this embodiment, items that are moved from the active context table to the tracking table may be processed twice. The processing time associated with the steps described with reference to FIG. 13B may be improved by skipping over the items which were newly added to the tracking table. It is further contemplated that any algorithm that accurately generates persistent context and items to be tracked can be employed for use with context miner 345. Additionally, the input parameters supplied to the context miner will determine which events, from a set of historical context, are identified as persistent context, context to be tracked, or context to be ignored. Any data mining algorithm that separates data or observed facts into three groups, those data of interest, those of potential interest, and those of no interest, can be employed.

Persistent Context Table

Figure 14:
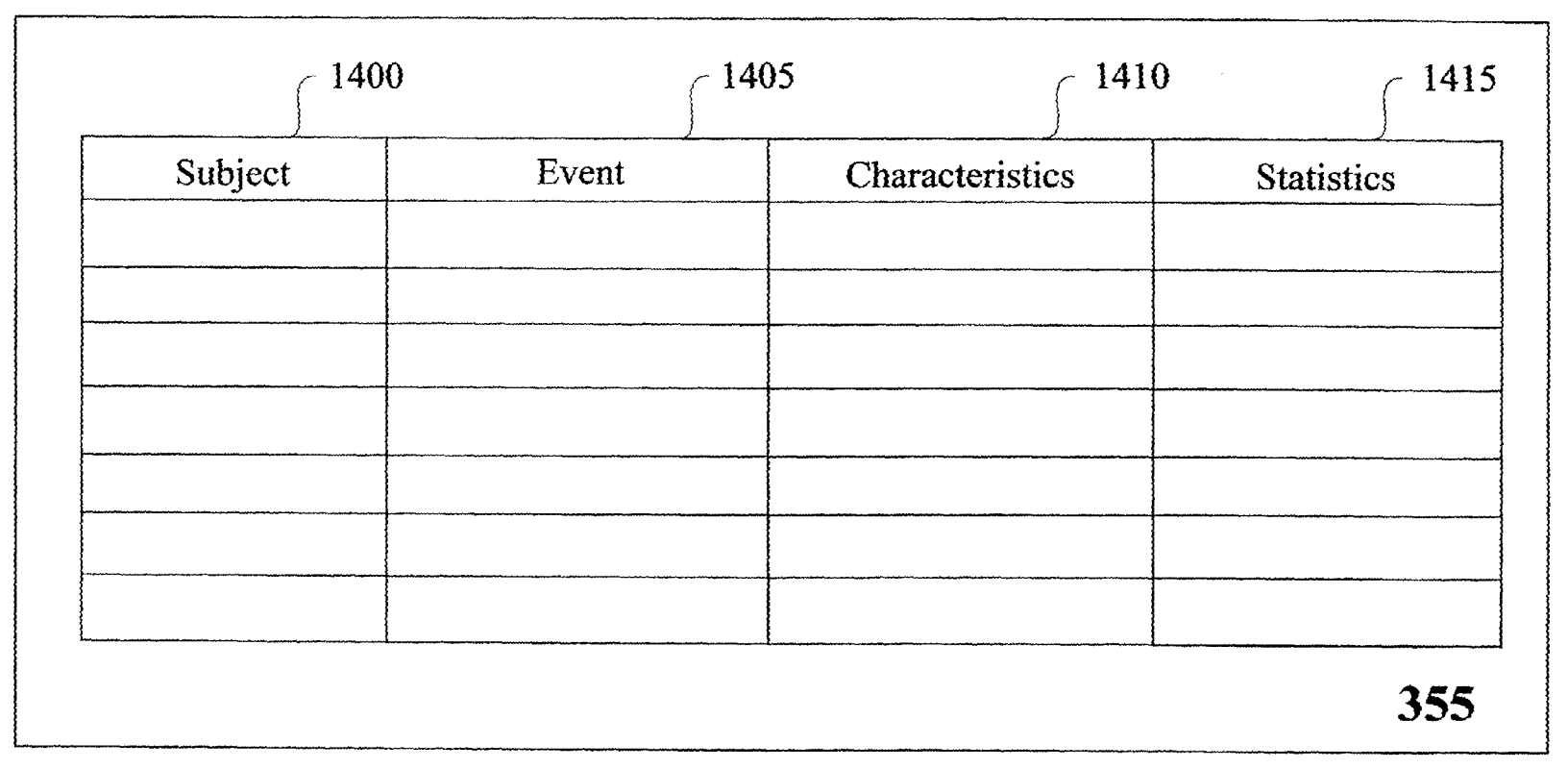

FIG. 14 is a sample data sheet illustrating the information stored in the persistent context table 355. Each entry in the persistent context table 355 contains four fields: subject 1400, event 1405, characteristics 1410, and statistics 1415. The subject 1400 is the person or object to which the persistent context pertains. The event 1405 is the context event that is being reported. The characteristics 1410 are extracted from the context type 905, context attributes 910, and duration 915.

The information extracted from each of 905, 910, and 915 is recorded if it is significantly associated with the subject 1400 and the event 1405 represented by this record. The statistics 1415 contain statistical data associated with the occurrence and frequency of the event. For example, a context event might say that Sam has a meeting in his office on Mondays from 2:00-3:00 p.m. The subject would be "Sam" and the event would be "office meeting". The characteristics might indicate that Robert attends 95% of the time, Mary attends 99% of the time, and that Julie and Ralph each attend 100% of the time. The characteristics might also indicate that Sam's phone is set to "Do not disturb" 100% of the time, but that his pager and his BlackBerry device are always active. The statistics associated with this entry might indicate that this meeting occurred on 98% of the Mondays during the past year. The statistics might also indicate that 95% of the time the duration of the meeting was less than or equal to 60 minutes and that 100% of the time the duration was less than or equal to 75 minutes.

Device Profiles Table

Figure 15:
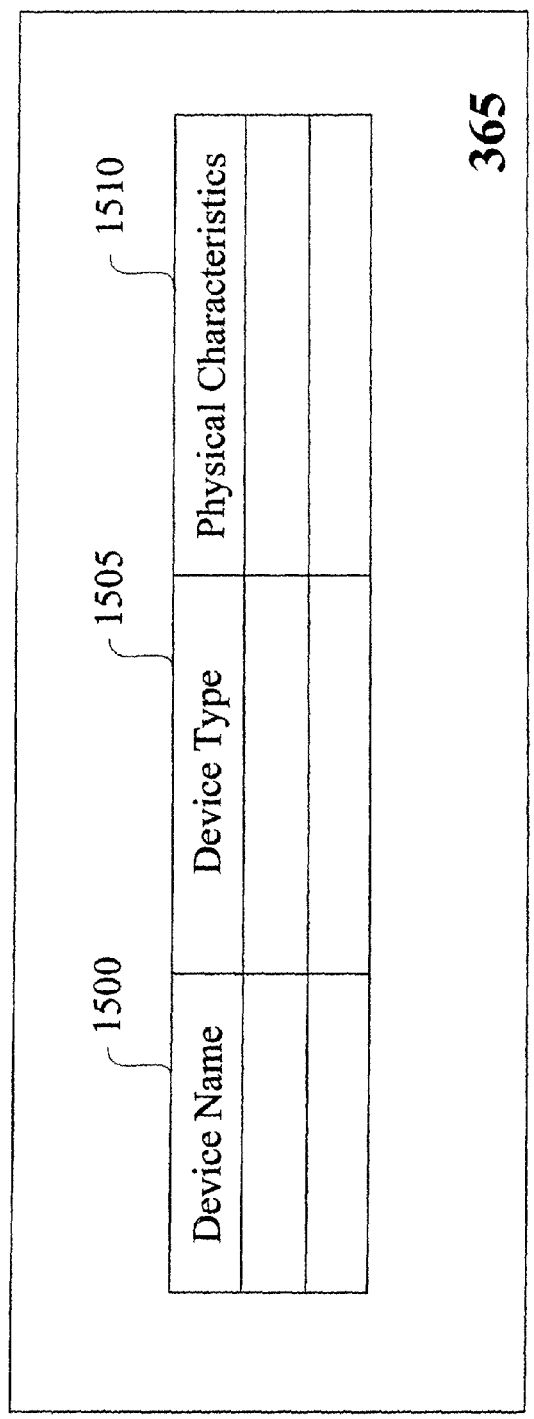
FIG. 15 is a sample data sheet illustrating the format of the device profiles information stored in the device profiles table.

FIG. 15 is a sample data sheet illustrating the format of the device profiles information stored in the device profiles table 365. Each record has three fields. The first field is labeled device name 1500. This field contains a unique name for the device being described by the record. The second field is labeled device type 1505. This field describes the type of the device from a content delivery perspective. This type of information includes the type of markup languages together with the application protocols supported by the device. The last field is labeled physical characteristics 1510. Field 1510 describes the physical characteristics of the device such as, for example, screen size, CPU type, and the amount of memory that is available. It is contemplated that this field may contain information obtained using standards such as composite capabilities/preference profiles (CCPP).

Content Groups Table

Figure 16:
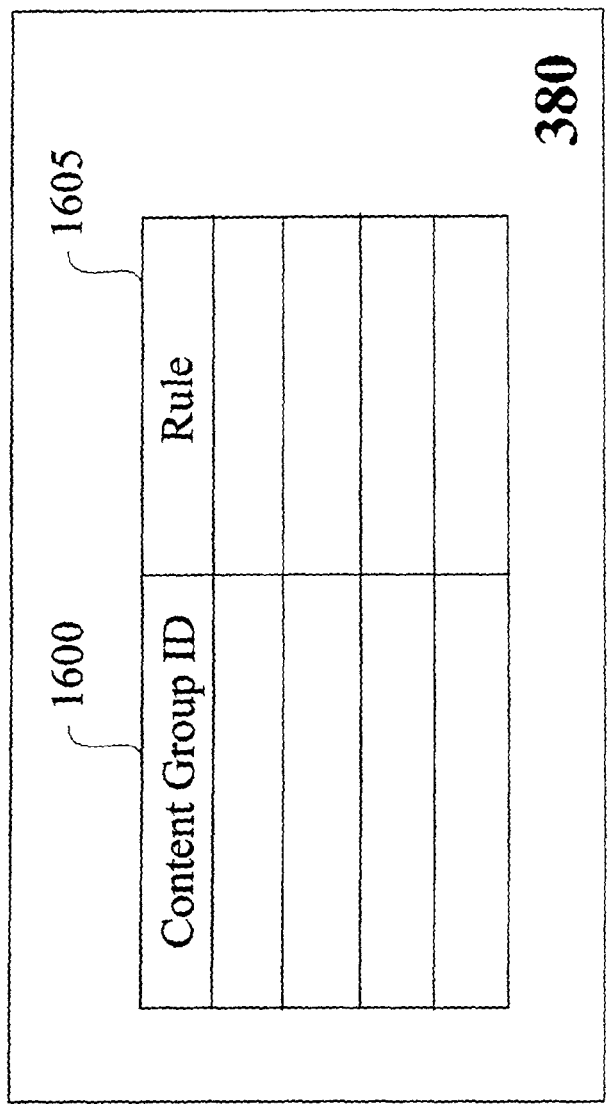
FIG. 16 is a sample data sheet illustrating the format of the content group record information stored in the content groups table.

FIG. 16 is a sample data sheet illustrating the format of the content group record information stored in the content groups table 380. Each record contains two fields. The first field is labeled content group identification 1600. This field associates a unique identification to the content group being described. The second field is labeled rule 1605. The information stored within this second field may be, for example, a rule that defines a set of URL's belonging to the described content group. This rule could be a regular expression on the URL space.

Policy Generator

Figure 17:
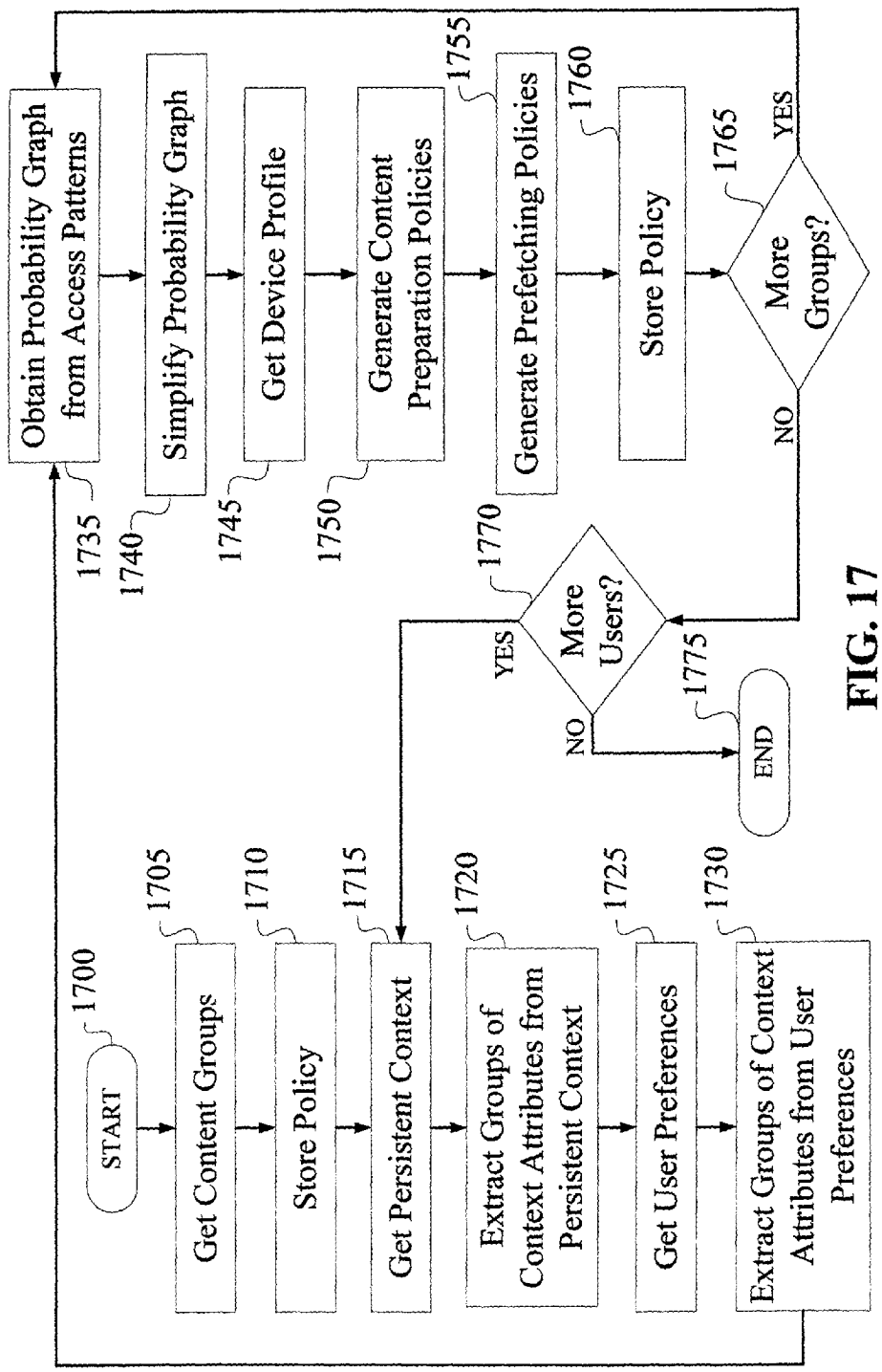
FIG. 17 is a flow chart illustrating the operation of the policy generator in accordance with an embodiment of the present invention.

Policies are generated by the policy generator 370. FIG. 17 is a flow chart illustrating the operation of the policy generator 370 in accordance with an embodiment of the present invention. Step 1700 starts the policy generation process. Initially, in step 1705, the process derives content group definitions. These definitions specify all of the content items which form content groups. The definitions are read from the content groups table 380 and map into content group definitions. The definitions are then stored as policies, in step 1710, in the policies table 375. The policy generator 370 then reads the persistent context for a user, in step 1715, from the persistent context table 355. A description of the format of persistent context records is given above with reference to FIG. 14.

Groups of context attributes are then extracted in step 1720 from the persistent context records. For example, a persistent context record might indicate that a given user is always in his or her office between 9:00 a.m. and 10:00 a.m., which could be used to pre-fetch content to their office device(s) or the replica store(s) serving the device(s). In this case, the location and time attribute are grouped together with respective values equal to "office" and "9:00 to 10:00 a.m.". Another example of a persistent context record might indicate that a given user always uses his or her BlackBerry device when he or she visits a particular location. In this case, the context attributes predict the device that the user will probably use, based on his or her persistent context. It is contemplated that other context attributes, could be used by the context miner 345 to make such device or pre-fetching predictions.

The next step, 1725, is to get user preferences from the user preferences table 360. There are three types of user preferences: user-defined contextual preferences, user-defined pre-fetching policies and user-defined preparation policies. From user-defined contextual preferences, additional groups of context attributes are extracted in step 1730. The correlation between context attributes and access patterns is generated by the correlator 340 and stored in the access pattern table 350. The format of access pattern records is described above with reference to FIG. 11. Essentially, the access pattern records are probability graphs associated with groups of context attributes. For each group of context attributes obtained in steps 1720 and 1730, the corresponding probability graphs are obtained in step 1735 from the access pattern table 350. These graphs indicate which content is likely to be accessed by the user, based on context attributes.

The next step taken by the policy generator 370 is to simplify these graphs in step 1740 by removing vertices of the graph based on any applicable removal policy such as least recently used (LRU). Although there are several ways to simplify these graphs, in this preferred embodiment, the removal policy drops all of the vertices with a weight value which is less than a predetermined threshold weight value. Thus, the policy generator 370 triggers only the pre-fetching and preparation of popular content groups. The predetermined threshold weight value can be specified off-line, either by the user or by an administrator. Alternatively, the threshold weight value can be computed online, based on different network conditions. The threshold weight value serves to control the number of policies that the system generates. It is contemplated that other removal policy criteria may be utilized.

After simplifying the probability graphs in step 1740, the policy generator 370 reads device profiles in step 1745 from the device profiles 365 table. The policy generator 370 then merges the device profiles with user-defined content preparation policies and context attributes which predict the device used, to generate content preparation policies in step 1750. With the simplified graphs obtained in step 1740, the policy generator 370, in step 1755, also generates content pre-fetching policies and adds user-defined pre-fetching policies to a list of content pre-fetching policies. In step 1760, the policy generator then stores all of the policies generated in step 1750 and 1755 in the policies table 375. The policy generator then determines whether there are additional groups of context attributes to process, in step 1765. If the answer is yes, the policy generator generates the associated policies following steps 1735 to 1760. Once all groups of context attributes associated with a user have been processed, the system checks, in step 1770, to determine whether there are additional users to process. If the answer is yes, the policy generator repeats steps 1715 to 1765: the extraction of access patterns, user preferences and associated device profiles to generate policies for that user. If the answer to step 1770 is no, as indicated by step 1775, the policy generator ends its execution until the next scheduled time for the generation of new policies.
Policies Table FIG. 18 is a sample data sheet illustrating the format of the policies information stored in the policies table 375. As illustrated in FIG. 18, the policies table 375 contains five pieces of information: the requesting user 1800, the object identifier 1805, the time range 1810, the device types 1815, and other applicable contexts 1820. The requesting user column 1800 stores information which identifies the user for whom this policy is maintained. The object identifier column 1805 stores information which identifies the content object in question. This information could be, for example, a filename or a URL. The time range column 1810 stores information which identifies the period of time during which this piece of content information is useful or interesting. The device types column 1815 stores information which indicates which types of devices this information is useful for. Finally, the other applicable contexts column 1820 stores information which indicates additional types of contexts in which this information is useful. For each entry in this table, all fields can be supplied or only a subset of these fields may be supplied.

It is contemplated that the policies table may contain additional fields or may only contain a subset of the fields described above. It is further contemplated that the time range 1810 and/or the device types 1815 could be considered types of context and could be included in the other applicable contexts 1820 rather than considered separately as described above with reference to this preferred embodiment.
SyncDB Table FIG. 19 is a sample data sheet illustrating the format of the information stored in the SyncDB table 1900. As illustrated in FIG. 19, the SyncDB table 1900 contains three primary pieces of information: the content group identification 1905, the replica descriptor 1910, and the expiration time 1915. The content group identification column 1905 contains information which identifies the unit of content information to be pre-fetched and pre-transcoded. This information could contain, for example, a filename or a URL. The replica descriptor column 1910 contains information which identifies one or more replica stores 310 in the network that should be kept synchronized. The expiration time column 1915 contains information which indicates the time beyond which this information is not expected to be useful. Once the current time has exceeded the expiration time, this content need not be maintained at the replica stores(s) 310 identified in the replica descriptor 1910. It is contemplated that the SyncDB table 1900 could contain additional pieces of information.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention. All such changes and modifications are intended to be included within the scope of the invention as defined by the appended claims.

What is claimed is:

1. A method of processing content in a network, the method comprising the steps of:
   predicting a device to be used by a user to access the network, wherein predicting the device is based at least in part on a pattern observed in a record of past context information associated with the user, and wherein predicting the device is performed prior to the user actually selecting the predicted device for accessing the network;
   predicting a content item to be requested by the user through the predicted device, wherein predicting the content item is based at least in part on a pattern observed in a record of past context information associated with the user, and wherein predicting the content item to be requested by the user through the predicted device is performed prior to the user actually requesting the content item using the predicted device;

transcoding the predicted content item from a first format into at least a second format for anticipated access by the user in accordance with context information associated with the predicted device, wherein at least the second format is compatible with the predicted device, and wherein transcoding is performed prior to the user actually requesting the predicted content item using the predicted device;

providing the predicted content item to the device in the at least second format in response to the user actually requesting the predicted content item through the predicted device; and pre-fetching the predicted content item and transferring the predicted content item to at least one replica store wherein the predicted content item will be held pending the user requesting the predicted content item.

2. The method as recited in claim 1 further comprising the step of discovering an access pattern for a specific combination of context attribute values.

3. The method as recited in claim 1 further comprising the step of entering an access pattern for a specific combination of context attribute values.

4. The method as recited in claim 1 further comprising the step of maintaining consistency of the predicted content item based on context information.

5. An article of manufacture for processing content in a network, the article comprising a memory device comprising one or more programs which when executed implement the steps of:

predicting a device to be used by a user to access the network, wherein predicting the device is based at least in part on a pattern observed in a record of past context information associated with the user, and wherein predicting the device is performed prior to the user actually selecting the predicted device for accessing the network;

predicting a content item to be requested by the user through the predicted device, wherein predicting the content item is based at least in part on a pattern observed in a record of past context information associated with the user, and wherein predicting the content item to be requested by the user through the predicted device is performed prior to the user actually requesting the content item using the predicted device;

transcoding the predicted content item from a first format into at least a second format for anticipated access by the user in accordance with context information associated with the predicted device, wherein at least the second format is compatible with the predicted device, and wherein transcoding is performed prior to the user actually requesting the predicted content item using the predicted device;

providing the predicted content item to the device in the at least second format in response to the user actually requesting the predicted content item through the predicted device; and pre-fetching the predicted content item and transferring the predicted content item to at least one replica store wherein the predicted content item will be held pending the user requesting the predicted content item.

6. The article of manufacture as recited in claim 5 further comprising the step of discovering an access pattern for a specific combination of context attribute values.

7. The article of manufacture as recited in claim 5 further comprising the step of entering an access pattern for a specific combination of context attribute values.

8. The article of manufacture as recited in claim 5 further comprising the step of maintaining consistency of the predicted content item based on context information.

* * * * *